(12) United States Patent
Yoshida

(10) Patent No.: US 11,656,811 B2
(45) Date of Patent: May 23, 2023

(54) PRINT SYSTEM, INFORMATION PROCESSING APPARATUS, PRINTING APPARATUS, METHOD OF CONTROLLING THE SAME, AND STORAGE MEDIUM

(71) Applicant: CANON KABUSHIKI KAISHA, Tokyo (JP)

(72) Inventor: Satoshi Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/669,451

(22) Filed: Feb. 11, 2022

(65) Prior Publication Data
US 2022/0261194 A1    Aug. 18, 2022

(30) Foreign Application Priority Data

Feb. 15, 2021  (JP) .............................. JP2021-022045
Jan. 5, 2022   (JP) .............................. JP2022-000683

(51) Int. Cl.
| | |
|---|---|
| *G06F 3/12* | (2006.01) |
| *G06K 15/16* | (2006.01) |
| *G06T 7/00* | (2017.01) |
| *G06K 15/02* | (2006.01) |
| *G06K 15/00* | (2006.01) |

(52) U.S. Cl.
CPC .......... *G06F 3/1208* (2013.01); *G06F 3/1256* (2013.01); *G06K 15/16* (2013.01); *G06K 15/1809* (2013.01); *G06K 15/403* (2013.01); *G06T 7/001* (2013.01); *G06T 2207/10008* (2013.01); *G06T 2207/30144* (2013.01)

(58) Field of Classification Search
CPC .... G06F 3/12; H04N 1/4426; H04N 1/00411; H04N 1/00474; H04N 1/4413; H04N 1/00413; H04N 1/12; G06K 15/4095
USPC ........................................................ 358/296
See application file for complete search history.

(56) References Cited

U.S. PATENT DOCUMENTS

| | | | |
|---|---|---|---|
| 11,455,129 B2 * | 9/2022 | Yasaki .................. | G06F 3/1208 |
| 2019/0332048 A1 * | 10/2019 | Yamanaka ......... | G03G 15/6579 |
| 2021/0072933 A1 * | 3/2021 | Yasaki .................. | G06F 3/1259 |

FOREIGN PATENT DOCUMENTS

JP          2019048387 A        3/2019

* cited by examiner

*Primary Examiner* — Darryl V Dottin
(74) *Attorney, Agent, or Firm* — Rossi, Kimms & McDowell LLP

(57) ABSTRACT

A print system including a printing apparatus that prints an image on a sheet, a verification apparatus that verifies a sheet printed by the printing apparatus and an information processing apparatus. The information processing apparatus determines whether or not a device having a discharge tray is present between the printing apparatus and the verification apparatus, and in a case where it is determined that the device is present, controls to discharge a sheet printed in a sample printing to the discharge tray when a timing of the sample printing for a user to confirm printing on the sheet is during execution of a print job in which the printing apparatus and the verification apparatus are used.

18 Claims, 20 Drawing Sheets

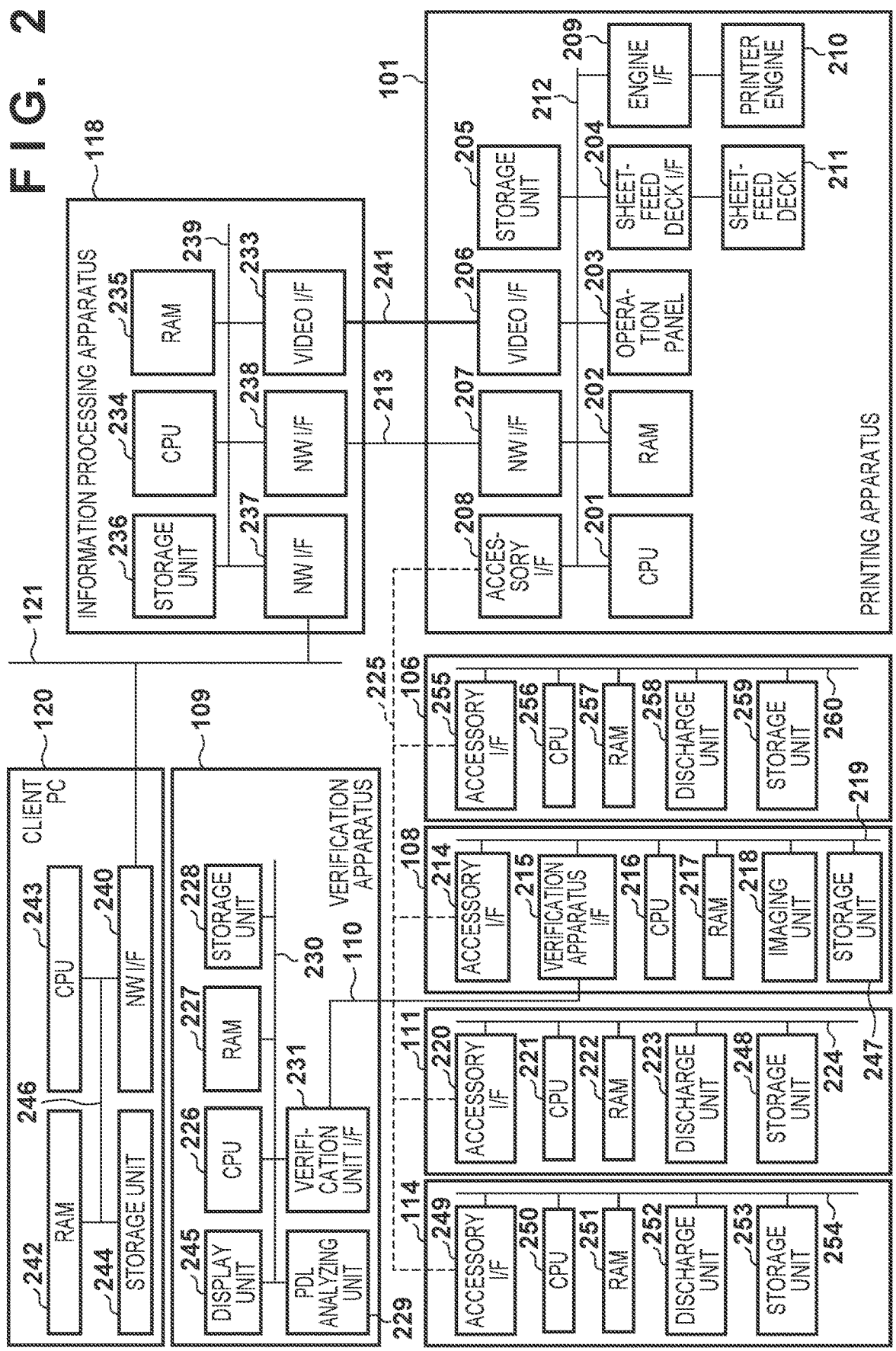

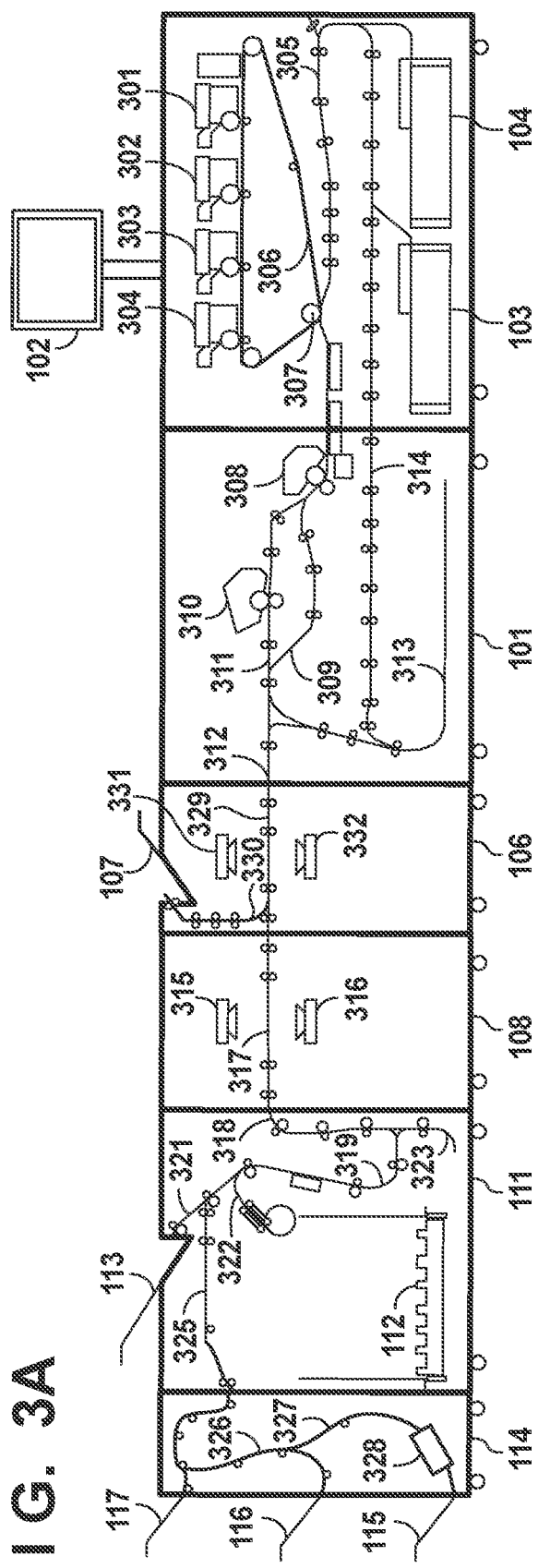
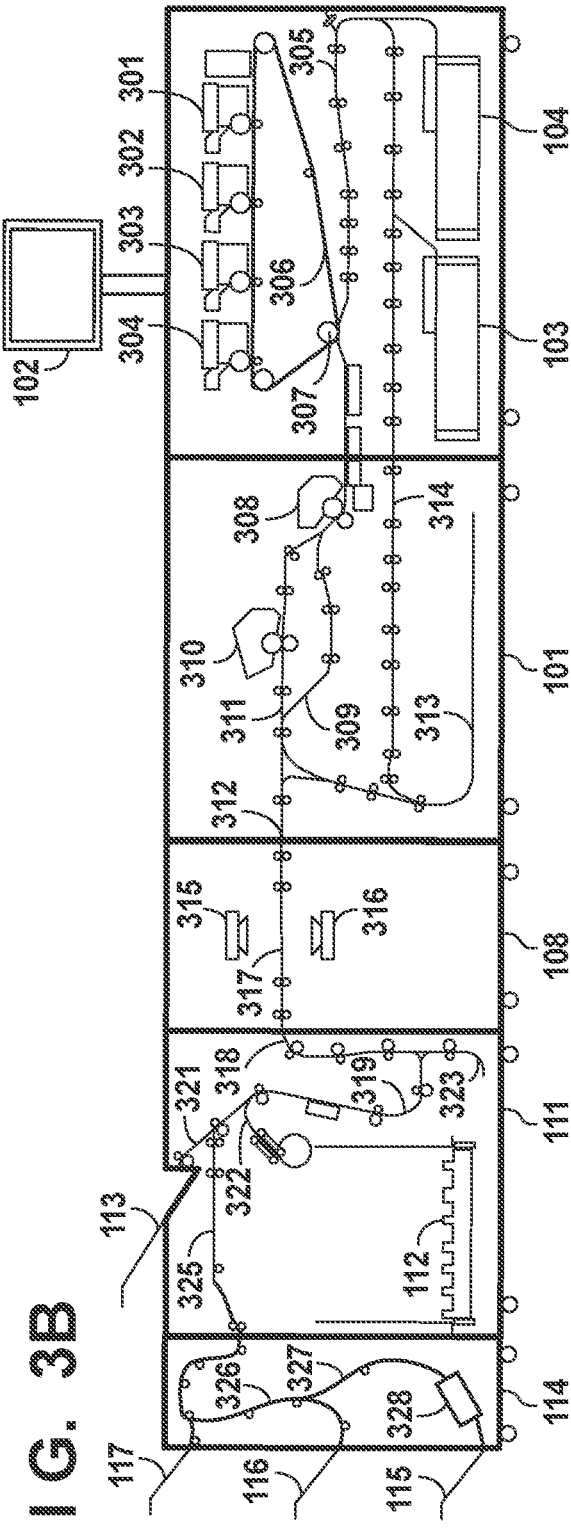

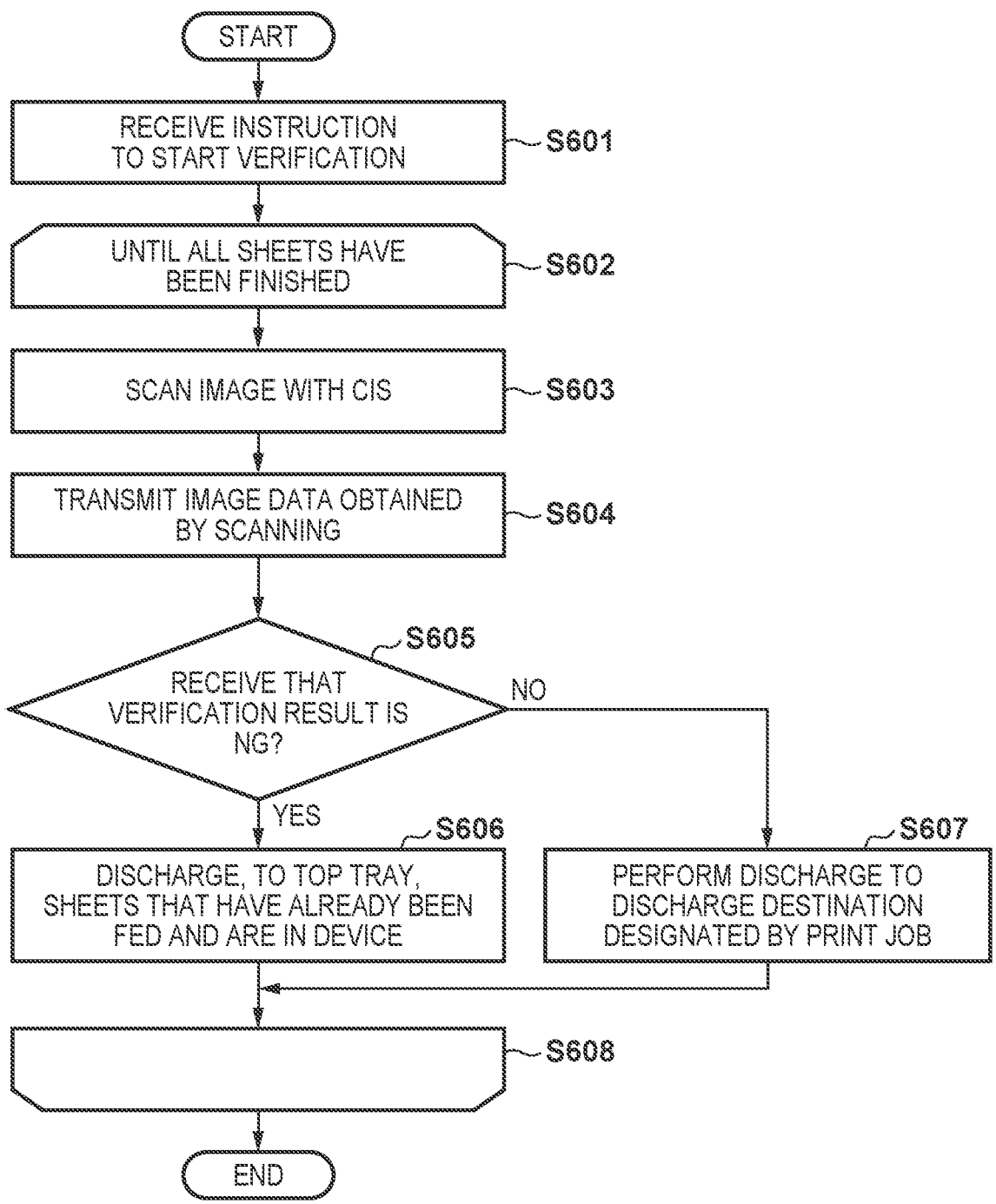

FIG. 7A

| UNIT NAME | UNIT ID | DISCHARGE TRAY NAME | DISCHARGE TRAY ID |
|---|---|---|---|
| ADJUSTMENT UNIT | Unit1 | TOP TRAY | Tray1 |
| VERIFICATION UNIT | Unit2 | N/A | N/A |
| CASE BINDING UNIT | Unit3 | MAIN TRAY | Tray2 |
| LARGE-VOLUME STACKER | Unit4 | TOP TRAY | Tray3 |
| LARGE-VOLUME STACKER | Unit4 | MAIN TRAY | Tray4 |
| FOLDING UNIT | Unit5 | MAIN TRAY | Tray5 |
| STAPLE UNIT | Unit6 | LOWER TRAY | Tray6 |
| STAPLE UNIT | Unit6 | MIDDLE TRAY | Tray7 |
| STAPLE UNIT | Unit6 | UPPER TRAY | Tray8 |

FIG. 7B

| UNIT NAME | UNIT ID |
|---|---|
| ADJUSTMENT UNIT | Unit1 |
| VERIFICATION UNIT | Unit2 |
| LARGE-VOLUME STACKER | Unit4 |
| STAPLE UNIT | Unit6 |

FIG. 7C

| UNIT NAME | UNIT ID |
|---|---|
| VERIFICATION UNIT | Unit2 |
| LARGE-VOLUME STACKER | Unit4 |
| STAPLE UNIT | Unit6 |

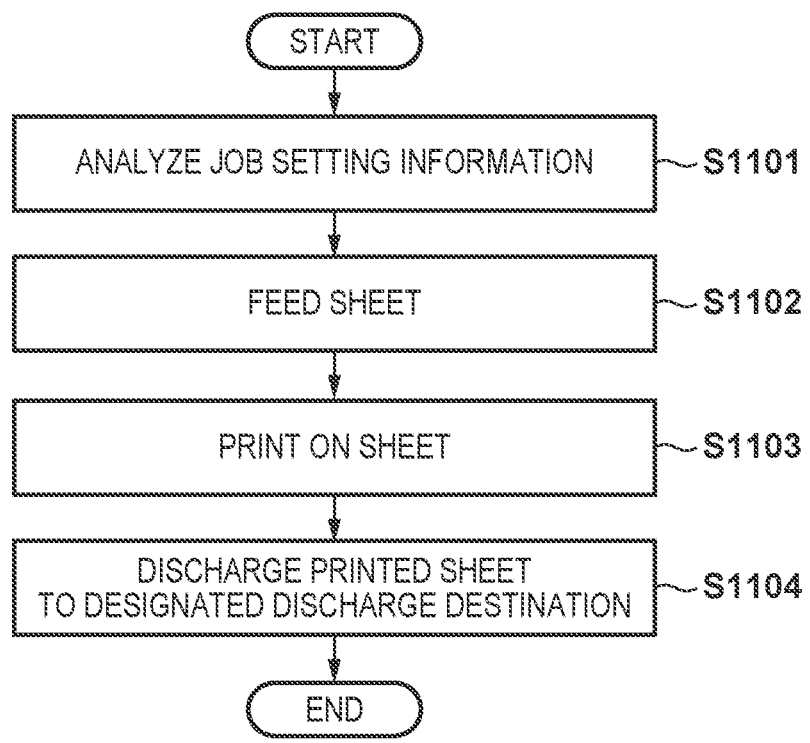

PRINT SYSTEM, INFORMATION PROCESSING APPARATUS, PRINTING APPARATUS, METHOD OF CONTROLLING THE SAME, AND STORAGE MEDIUM

BACKGROUND OF THE INVENTION

Field of the Invention

The present invention relates to a print system, an information processing apparatus, a printing apparatus, a method of controlling the same, and a storage medium.

Description of the Related Art

Verification apparatuses that read printed products printed by printing apparatuses and verify the quality of the printed products are known. Such verification apparatuses can detect defects in images such as dirt, print omission, errors in text, quality of barcodes, and the like. Printed products in which these defects are detected are separated from normal printed products without a defect by being discharged to a discharge destination different from the discharge destination of normal printed products, for example. To perform verification with such verification apparatuses, it is necessary to register in advance a reference image to be a reference for printed products without a defect.

Meanwhile, there is a sample printing (printing with intermediate checking) function in printing apparatuses. This sample printing is a function for discharging printed products to a discharge tray different from a discharge tray set in a print job. By using this function, a user can discharge printed products to another discharge tray even when printed products are discharged to a discharge tray (for example, a large-volume stacker) that cannot be opened and closed until all jobs are completed, for example. By discharging sample printed products to another discharge tray in this way, it becomes possible to confirm printed color and printed data of printed products using the sample printed products.

Since at least one sample printed sheet is added when sample printing is performed, there is a possibility that the order may become inconsistent with that of the reference images that the verification apparatus expects, and the verification result may become NG (defective). Japanese Patent Laid-Open No. 2019-048387 describes that, in an image forming apparatus provided with a sample printing function which is printing for a user to perform confirmation before or during normal printing, sample printing is not performed for jobs for which image verification is performed.

In Japanese Patent Laid-Open No. 2019-048387, sample printing is not performed for all the jobs for which image verification is performed. In other words, for example, both image verification and sample printing cannot be achieved even in a device configuration or a situation in which both image verification and sample printing can be achieved, and so, there is a problem that user convenience is lost.

SUMMARY OF THE INVENTION

An aspect of the present invention is to eliminate the above-mentioned problem with conventional technology.

A feature of the present invention is to provide a technique for improving user convenience by achieving both verification of printed sheets and sample printing.

According to a first aspect of the present invention, there is provided a print system operable to verify a printed sheet, the system comprising: a printing apparatus that prints an image on a sheet; a verification apparatus that receives and verifies a sheet printed by the printing apparatus and then conveyed; and an information processing apparatus, wherein the information processing apparatus comprises: at least one processor and at least one memory configured to: determine whether or not a device having a discharge tray is present between the printing apparatus and the verification apparatus, and in a case where it is determined that the device is present, when a timing of sample printing for a user to confirm printing on a sheet is during execution of a print job in which the printing apparatus and the verification apparatus are used, control to discharge the sheet printed in the sample printing to the discharge tray.

According to a second aspect of the present invention, there is provided an information processing apparatus operable to control a printing apparatus and a verification apparatus configured to receive and verify a sheet printed in the printing apparatus and then conveyed, the information processing apparatus comprising: at least one processor and at least one memory are configured to: determine whether or not a device having a discharge tray is present between the printing apparatus and the verification apparatus, and in a case where it is determined that the device is present, when a timing of sample printing for a user to confirm printing on a sheet is during execution of a print job in which the printing apparatus and the verification apparatus are used, control to discharge the sheet printed in the sample printing to the discharge tray.

According to a third aspect of the present invention, there is provided a printing apparatus, comprising: a printing unit that prints an image on a sheet; a verification unit that receives and verifies a sheet printed by the printing unit and then conveyed; and at least one processor and the at least one memory are configured to: determine whether or not a conveyance unit interposed between the printing unit and the verification unit and having a discharge tray is present, and in a case where it is determined that the conveyance unit is present, when a timing of sample printing for a user to confirm printing on a sheet is during execution of a print job in which the printing unit and the verification unit are used, control to discharge the sheet printed in the sample printing to the discharge tray.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for describing configurations of the printing apparatus, a verification apparatus, the information processing apparatus, and other apparatuses that the print system according to the embodiment has.

FIG. 3A and FIG. 3B depict structural cross-section views for respectively describing internal configurations of the printing apparatus according to the embodiment.

FIG. 6 is a flowchart for describing a process for when the verification unit according to the embodiment executes verification.

FIG. 7A to FIG. 7C depict views illustrating examples of information for the information processing apparatus according to a first embodiment to manage the device configuration of the printing apparatus.

FIG. 11 is a flowchart for describing an operation for when the printing apparatus according to the first embodiment executes a print job.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Further, as long as the functions of the present invention are realized, the present invention can be applied to an information processing apparatus that is connected via a network such as a LAN (Local Area Network) or a WAN (Wide Area Network) and performs processing. That is, the system configuration in which the various terminals described in the following embodiments are connected is an example, and it is needless to say that there are various configuration examples depending on the application and purpose.

Figure 1A:
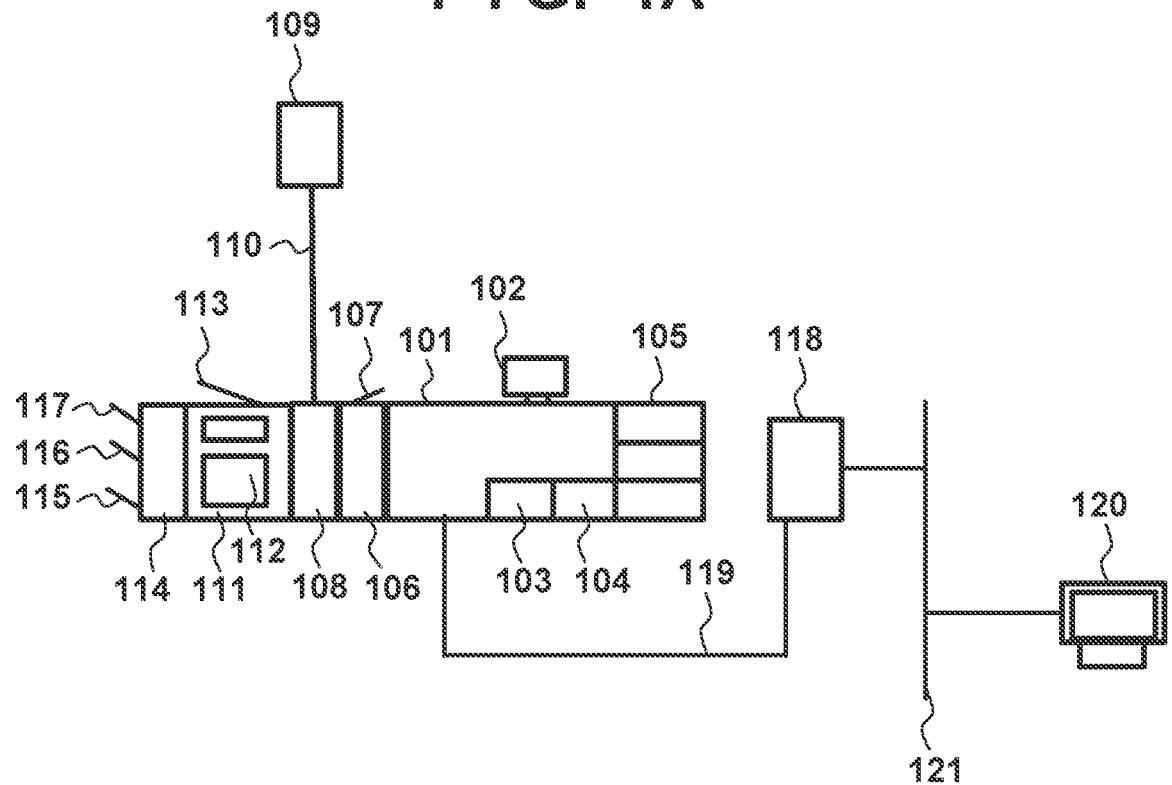
FIG. 1A and FIG. 1B depict views for respectively describing configurations of a print system including an information processing apparatus, a printing apparatus, and other apparatuses according to an embodiment of the present invention.
Figure 1B:
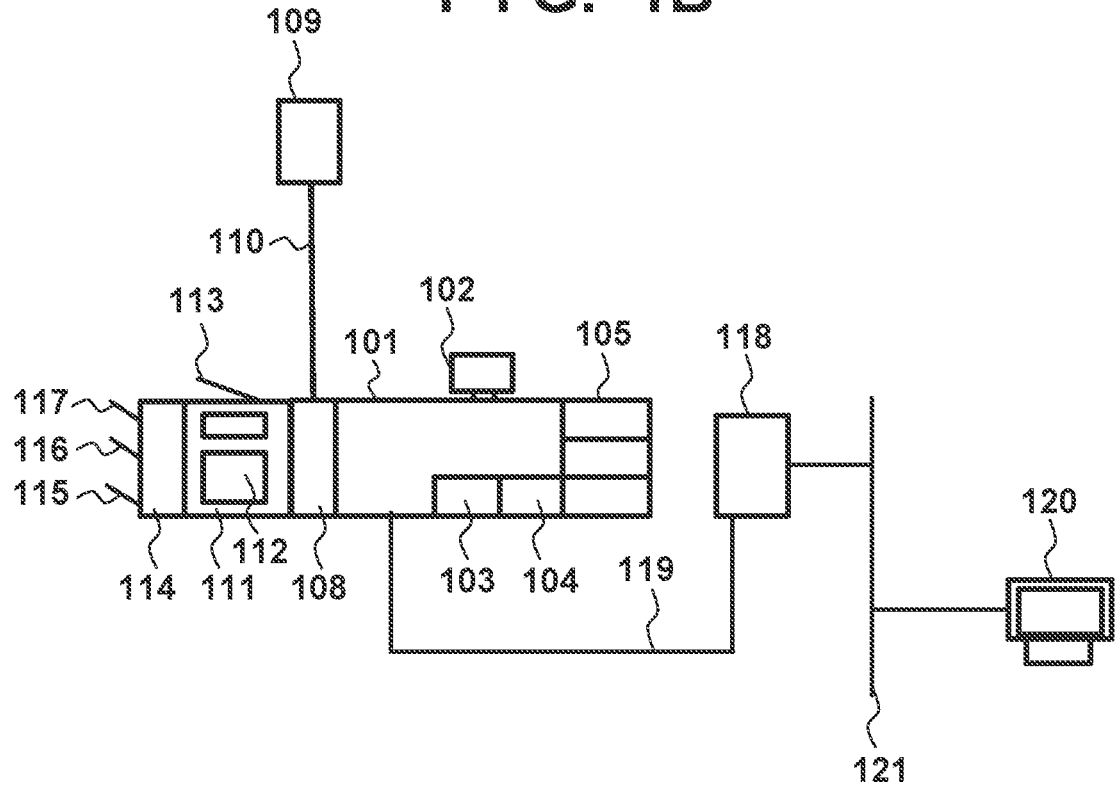

FIG. 1A and FIG. 1B depict views for respectively describing configurations of a print system including an information processing apparatus, a printing apparatus, and other apparatuses according to an embodiment of the present invention. Although the printing apparatus according to the embodiment will be described using a printing apparatus of an electro-photographic method, the printing apparatus may be a printing apparatus of a different image forming method, such as an ink jet method or an offset method. In the embodiment, description will be given with reference to FIG. 1A, which illustrates a configuration in which a unit upstream of a verification unit 108 (adjustment unit 106 of FIG. 1A) is present, and FIG. 1B, which illustrates a configuration in which a unit upstream of the verification unit 108 is not present.

First, FIG. 1A will be described.

A printing apparatus 101 is connected to an information processing apparatus 118 via a cable 119. The information processing apparatus 118 is connected to a client computer (PC) 120 via a network 121. The printing apparatus 101 includes an operation panel 102 and sheet-feed decks 103 and 104. Further, an optional deck 105 comprising three layers of sheet-feed decks is connected to the printing apparatus 101. The printing apparatus 101 is, for example, a printing apparatus of an electro-photographic method. Further, the operation panel 102 is, for example, a user interface provided with a touch panel of an electrostatic capacitance method.

Further, the adjustment unit 106, the verification unit 108, a large-volume stacker 111, and a staple unit 114 are connected to the printing apparatus 101. The adjustment unit 106 includes a top tray 107. The adjustment unit 106 has an imaging unit inside the unit and uses a captured image to correct the density and the registration between front and back of the image to be printed. The verification unit 108 is connected to a verification apparatus 109 via a cable 110. The large-volume stacker 111 includes a main tray 112 and a top tray 113, and several thousand sheets can be stacked at a time on the main tray 112. The staple unit 114 includes a lower tray 115, a middle tray 116, and an upper tray 117, and products can be discharged and stacked on these trays.

A print job is generated by the client PC 120, transmitted to the information processing apparatus 118 via the network 121, and managed by the information processing apparatus 118. The print job is then transmitted from the information processing apparatus 118 to the printing apparatus 101 via the cable 119, and the printing apparatus 101 performs a process of printing on a sheet in accordance with the print job. The printed sheet passes through the adjustment unit 106, the verification unit 108, the large-volume stacker 111, and the staple unit 114, and thus a printed product is created.

The client PC 120, the information processing apparatus 118, and the verification apparatus 109 may take a form of connecting to the cable 119 so as to be able to communicate with the printing apparatus 101. That is, the form of connection between the printing apparatus 101, the information processing apparatus 118, and the client PC 120 illustrated in FIGS. 1A and 1B is an example, and it is needless to say that there are various forms of connection in addition to those illustrated in this embodiment.

FIG. 1B is a diagram for describing an example of a system that differs from FIG. 1A. Incidentally, in FIG. 1B, parts in common with the above-described FIG. 1A are denoted by the same reference numerals, and their description thereof will be omitted.

Units with various functions are connected to printing apparatuses for commercial printing. The types of units connected to a printing apparatus vary depending on the user who uses the printing apparatus because the required functions vary depending on the user. The printing apparatus 101 of FIG. 1B is connected with the verification unit 108, the large-volume stacker 111, and the staple unit 114. That is, compared to FIG. 1A, the adjustment unit 106 is not connected. That is, it is a system configuration that can be used by a user who does not require the function of the adjustment unit.

FIG. 2 is a block diagram for describing configurations of the printing apparatus 101, the verification apparatus 109, the information processing apparatus 118, and other apparatuses that the print system according to the embodiment has.

First, the hardware configuration of the printing apparatus 101 will be described.

A CPU (Central Processing Unit) 201 manages the control and calculation in each unit in the printing apparatus 101 via a system bus 212. The CPU 201 manages the execution of programs stored in a storage unit 205 and deployed in a RAM (Random Access Memory) 202. The RAM 202 is a common type of volatile storage apparatus that can be accessed directly from the CPU 201 and is used as the work area of the CPU 201 or also provides a temporary data storage region. The storage unit 205 functions as a temporary storage region and a work memory during the operation of the printing apparatus 101. The storage unit 205 includes, for example, an HDD, an SD memory, a flash memory, and the like. Incidentally, the same applies to the storage unit of each apparatus described below.

An engine I/F 209 manages the communication between the CPU 201 and a printer engine 210 and the control of the CPU 201 for the printer engine 210. A sheet-feed deck I/F 204 manages the communication with and the control of a sheet-feed deck 211. The sheet-feed deck 211 collectively refers to the aforementioned sheet-feed deck 103, sheet-feed deck 104, and optional deck 105 as hardware configurations. An operation panel 203 is a hardware configuration of the operation panel 102 described above and provides a user interface for performing a general operation of the printing apparatus 101. In the present embodiment, assume that the operation panel 203 is provided with a touch panel of an electrostatic capacitance method. A network interface (hereinafter, NW I/F) 207 is connected to an NW I/F 238 of the information processing apparatus 118 via a cable 213 and controls communication between the information processing apparatus 118 and the printing apparatus 101. In this example, the interfaces connected to the system buses 212 and 239 are directly connected, but the information processing apparatus 118 and the printing apparatus 101 may be connected to each other by, for example, a network or the like, and the connection configuration is not limited. A video I/F 206 is connected to a video I/F 233 via a video cable 241 and manages the communication of image data between the information processing apparatus 118 and the printing apparatus 101.

The interface in the information processing apparatus 118 for connecting to the printing apparatus 101 may be a configuration in which the functions of the NW I/F 238 and the video I/F 233 are integrated. Also, the interface in the printing apparatus 101 for connecting to the information processing apparatus 118 may be a configuration in which the functions of the NW I/F 207 and the video I/F 206 are integrated.

An accessory I/F 208 connects to an accessory I/F 214, an accessory I/F 220, an accessory I/F 249, and an accessory I/F 255 via a cable 225. That is, the printing apparatus 101, the adjustment unit 106, the verification unit 108, the large-volume stacker 111, and the staple unit 114 communicate with each other via the accessory I/Fs 208 and 214, 220, 249, 255.

Next, the hardware configuration of the adjustment unit 106 will be described.

A CPU 256 manages the control and calculation of each unit in the adjustment unit 106 via a system bus 260. The CPU 256 manages the execution of programs stored in a storage unit 259 and deployed in a RAM 257. The RAM 257 is a common type of volatile storage apparatus that can be accessed directly from the CPU 256 and is used as the work area of the CPU 256 or also a temporary data storage region. The storage unit 259 functions as a temporary storage region and a work memory for when the adjustment unit 106 is operating. A discharge unit 258 manages the control and monitoring of a discharge operation of a sheet to the top tray 107 and a stacking status on the top tray 107.

Next, the hardware configuration of the verification unit 108 will be described.

A CPU 216 manages the control and calculation of each unit in the verification unit 108 via a system bus 219. The CPU 216 manages the execution of programs stored in a storage unit 247 and deployed in a RAM 217. The RAM 217 is a common type of volatile storage apparatus that can be accessed directly from the CPU 216 and is used as the work area of the CPU 216 or also a temporary data storage region. The storage unit 247 functions as a temporary storage region and a work memory for when of the verification unit 108 is operating. A verification apparatus I/F 215 is connected to a verification unit I/F 231 of the verification apparatus 109 via the cable 110. That is, the verification unit 108 communicates with the verification apparatus 109 via the verification apparatus I/F 215 and the verification unit I/F 231. An imaging unit 218 includes, for example, an imaging function incorporating a contact image sensor (hereinafter, referred to as CIS) and captures a sheet passing through the verification unit 108 and transmits the captured image to the verification apparatus 109 via the verification apparatus I/F 215. Incidentally, the CIS of the imaging unit 218 is an example of a sensor and may be another type of sensor such as a CCD image sensor, and the imaging method thereof is not limited.

Next, the hardware configuration of the large-volume stacker 111 will be described.

A CPU 221 manages the control and calculation of each unit in the large-volume stacker 111 via a system bus 224. The CPU 221 manages the execution of programs stored in a storage unit 248 and deployed in a RAM 222. The RAM 222 is a common type of volatile storage apparatus that can be accessed directly from the CPU 221 and is used as the work area of the CPU 221 or also a temporary data storage region. The storage unit 248 functions as a temporary storage region and a work memory for when the large-volume stacker 111 is operating. A discharge unit 223 manages a discharge operation of a sheet to the main tray 112 and the top tray 113 illustrated in FIGS. 1A and 1B and the monitoring and control of the stacking status of each of the main tray 112 and the top tray 113.

Next, the hardware configuration of the staple unit 114 will be described.

A CPU 250 manages the control and calculation of each unit in the staple unit 114 via a system bus 254. The CPU 250 manages the execution of programs stored in a storage unit 253 and deployed in a RAM 251. The RAM 251 is a common type of volatile storage apparatus that can be accessed directly from the CPU 250 and is used as the work area of the CPU 250 or also a temporary data storage region. The storage unit 253 functions as a temporary storage region and a work memory for when the staple unit 114 is operating. A discharge unit 252 manages a discharge operation to the lower tray 115, the middle tray 116, and the upper tray 117 illustrated in FIGS. 1A and 1B, and the monitoring and control of the stacking status of each tray.

Next, the hardware configuration of the verification apparatus 109 will be described. A CPU 226 manages the control and calculation of each unit in the verification apparatus 109 via a system bus 230. The CPU 226 manages the execution of programs stored in a storage unit 228 and deployed in a RAM 227. The RAM 227 is a common type of volatile storage apparatus that can be accessed directly from the CPU 226 and is used as the work area of the CPU 226 or also a temporary data storage region. The storage unit 228 functions as a temporary storage region and a work memory for when the verification apparatus 109 is operating. A PDL analyzing unit 229 reads PDL data such as PDF, PostScript, and PCL received from the client PC 120 or the information processing apparatus 118 and executes interpretation processing. A display unit 245 is, for example, a display connected to the verification apparatus 109 and accepts the inputs of the user to the verification apparatus 109 and displays the state of the verification apparatus 109.

Next, the hardware configuration of the information processing apparatus 118 will be described.

A CPU 234 manages the control and calculation of each unit in the information processing apparatus 118 via a system bus 239. The CPU 234 manages the execution of programs stored in a storage unit 236 and deployed in a RAM 235. The RAM 235 is a common type of volatile storage apparatus that can be accessed directly from the CPU 234 and is used as the work area of the CPU 234 or also a temporary data storage region. The storage unit 236 functions as a temporary storage region and a work memory for when the information processing apparatus 118 is operating. A network interface (hereinafter, NW I/F) 237 is connected to an NW I/F 240 of the client PC 120 via the network 121. The information processing apparatus 118 communicates with the client PC 120 via the NW I/F 237 and the NW I/F 240.

Last, the hardware configuration of the client PC 120 will be described.

A CPU 243 manages the control and calculation of each unit in the client PC 120 via a system bus 246. The CPU 243 manages the execution of programs stored in a storage unit 244 and deployed in a RAM 242. The RAM 242 is a common type of volatile storage apparatus that can be accessed directly from the CPU 243 and is used as the work area of the CPU 243 or also a temporary data storage region. The storage unit 244 functions as a temporary storage region and a work memory for when the client PC 120 is operating.

Incidentally, the device configuration illustrated in FIG. 1B, when compared with the device configuration illustrated in FIG. 1A, is a configuration in which the adjustment unit 106 is not connected. Therefore, the block diagram of the device configuration illustrated in FIG. 1B has a configuration in which the units of the adjustment unit 106 have been excluded from the block diagram illustrated in FIG. 2. Since various roles and functions are the same as that of FIG. 2, description thereof will be omitted.

FIG. 3A depicts a structural cross-section view explaining an internal configuration of the printing apparatus 101 according to the embodiment.

The printing apparatus 101 receives the inputs of the user through the operation panel 102 and displays printing or device statuses. Various types of sheets can be stored in the sheet-feed decks 103 and 104. In each sheet-feed deck, only the uppermost sheet of the stored sheet can be separated and conveyed to a sheet conveyance path 305. Developing stations 301 to 304 form toner images using colored toners of Y, M, C, and K, respectively, to form a color image. The color image formed here is primary transferred to an intermediate transfer belt 306. The intermediate transfer belt 306 rotates in a clockwise direction in FIG. 3A, and the color image is transferred at a secondary transfer position 307 to the sheet conveyed from the sheet conveyance path 305. A fixing unit 308 includes a pressing roller and a heating roller, and by the sheet passing between these rollers, the toner is melted and pressure bonded, and the color image is fixed to the sheet. The sheet that has passed through the fixing unit 308 is conveyed to a path 312 through a sheet conveyance path 309. If further melting and pressure bonding are required for fixing depending on the type of the sheet, the sheet, after passing through the fixing unit 308, is conveyed to a second fixing unit 310 through an upper sheet conveyance path, and after additional melting and pressure bonding are performed, the sheet is conveyed to the path 312 through a sheet conveyance path 311. When the image forming mode is two-sided, the sheet on which an image has been fixed on one side is conveyed to a sheet reversing path 313, and after the front and back of the sheet have been reversed, the sheet is conveyed through a two-sided conveyance path 314, and an image transfer to the second side is performed at the secondary transfer position 307.

In the adjustment unit 106, CISs 331 and 332 are arranged so as to be opposite each other. The CIS 331 is a sensor for reading the top side of the sheet, and CIS 332 is a sensor for reading the bottom side of the sheet. The adjustment unit 106 scans the sheet using the CISs 331 and 332 when the sheet conveyed to a sheet conveyance path 329 reaches a predetermined position. The image data obtained by the scanning is transmitted to the printing apparatus 101 via the accessory I/F 255 and the accessory I/F 208. The CPU 201 of the printing apparatus 101 calculates the amount of shift in the density and front/back registration based on the received image data. Based on the shift amount calculated in this way, the CPU 256 of the adjustment unit 106 performs correction so that the density and front/back registration becomes ideal values. Note that a correction chart needs to be used for such correction of density and front/back registration. The correction chart is printed by an execution instruction from the operation panel 203 before executing a print job or is printed at a periodic timing (e.g., every 100 sheets or the like) during a print job. When printing the correction chart, the CPU 201 of the printing apparatus 101 conveys the correction chart to a sheet conveyance path 330 and issues an instruction to discharge the chart to the top tray 107. In this way, it is possible to prevent the products and the correction chart, which becomes waste paper, from being stacked on the same discharge tray, and it becomes easier for the user to distinguish the products from waste paper.

Next, the configuration of the verification unit 108 will be described.

In the verification unit 108, CISs 315 and 316 are arranged so as to be opposite each other. The CIS 315 is a sensor for reading the top side of the sheet, and CIS 316 is a sensor for reading the bottom side of the sheet. The verification unit 108 scans the sheet using the CISs 315 and 316 when the sheet conveyed to a sheet conveyance path 317 reaches a predetermined position. The image data obtained by the scanning is transmitted to the verification apparatus 109 via the verification apparatus I/F 215, the cable 110, and the verification unit I/F 231. The CPU 226 of the verification apparatus 109 determines whether or not there is a defect in the received image data and notifies the verification unit 108 of the result of determination via the verification unit I/F 231, the cable 110, and the verification apparatus I/F 215 again. With this, the CPU 216 of the verification unit 108 notifies the large-volume stacker 111 of the received determination result via the accessory I/Fs 214 and 220.

Next, the configuration of the large-volume stacker 111 will be described.

The large-volume stacker 111 has the main tray 112 as a tray for stacking sheets. The sheet that has passed through the verification unit 108 enters the large-volume stacker 111 from a sheet conveyance path 318 through a sheet conveyance path 319. The sheet is stacked on the main tray 112 from the sheet conveyance path 319 through a sheet conveyance path 322. The large-volume stacker 111 has the top tray 113 as a discharge tray. The CPU 221 of the large-volume stacker 111 discharges, to the top tray 113, sheets in which a defect has been detected by the verification apparatus 109. When discharging a sheet to the top tray 113, the sheet is conveyed from the sheet conveyance path 319 to the top tray 113 via a sheet conveyance path 321. A reversing unit 323 for reversing sheets is used when a sheet is stacked on the main tray 112. When the sheet is stacked on the main tray 112, the sheet is reversed once by the reversing unit 323 so that the direction of the sheet when it is stacked is the same as the direction of the sheet when it entered. When the sheet is conveyed to the top tray 113, the sheet is discharged as is without flipping when it is stacked, so the reversal operation in the reversing unit 323 is not performed. When outputting a sheet to the staple unit 114, the sheet is conveyed from the sheet conveyance path 319 via a sheet conveyance path 325.

Next, the configuration of the staple unit 114 will be described.

The staple unit 114 is a unit capable of stapling sheets or generating saddle stitched pamphlets. The staple unit 114 has the upper tray 117 on which sheets are stacked, the middle tray 116 on which stapled products are discharged, and the lower tray 115 to which saddle stitched products are discharged. The sheets that have passed through the large-volume stacker 111 enter the staple unit 114 through the sheet conveyance path 326. When generating a stapled product, the sheets pass through the sheet conveyance path 326, are stapled, and then stacked on the middle tray 116. When generating a saddle stitched product, the sheets are conveyed from the sheet conveyance path 326 to a saddle stitching unit 328 via a sheet conveyance path 327. The CPU 250 of the staple unit 114 performs saddle stitching in the discharge unit 252, and the saddle stitched product is discharged to the lower tray 115.

FIG. 3B depicts a structural cross-section view illustrating a configuration in which the adjustment unit 106 is not connected, corresponding to FIG. 1B. Therefore, FIG. 3B is a configuration in which the adjustment unit 106 has been excluded from FIG. 3A; the portions in common with FIG. 3A have been denoted by the same reference numerals, and description thereof will be omitted.

Processing as a feature of the present embodiment will be described below with reference to flowcharts. The processing of the printing apparatus 101 described in the following flowchart is achieved by the CPU 201 of the printing apparatus 101 executing a program stored in the storage unit 205 by deploying it in the RAM 202. Also, the processing of the verification apparatus 109 described in the following flowcharts is achieved by the CPU 226 of the verification apparatus 109 executing a program stored in the storage unit 228 by deploying it in the RAM 227. Also, the processing of the information processing apparatus 118 described in the following flowcharts is achieved by the CPU 234 of the information processing apparatus 118 executing a program stored in the storage unit 236 by deploying it in the RAM 235. Further, the processing of the verification unit 108 described in the following flowcharts is achieved by the CPU 216 of the verification unit 108 executing a program stored in the storage unit 247 by deploying it in the RAM 217.

Figure 4:
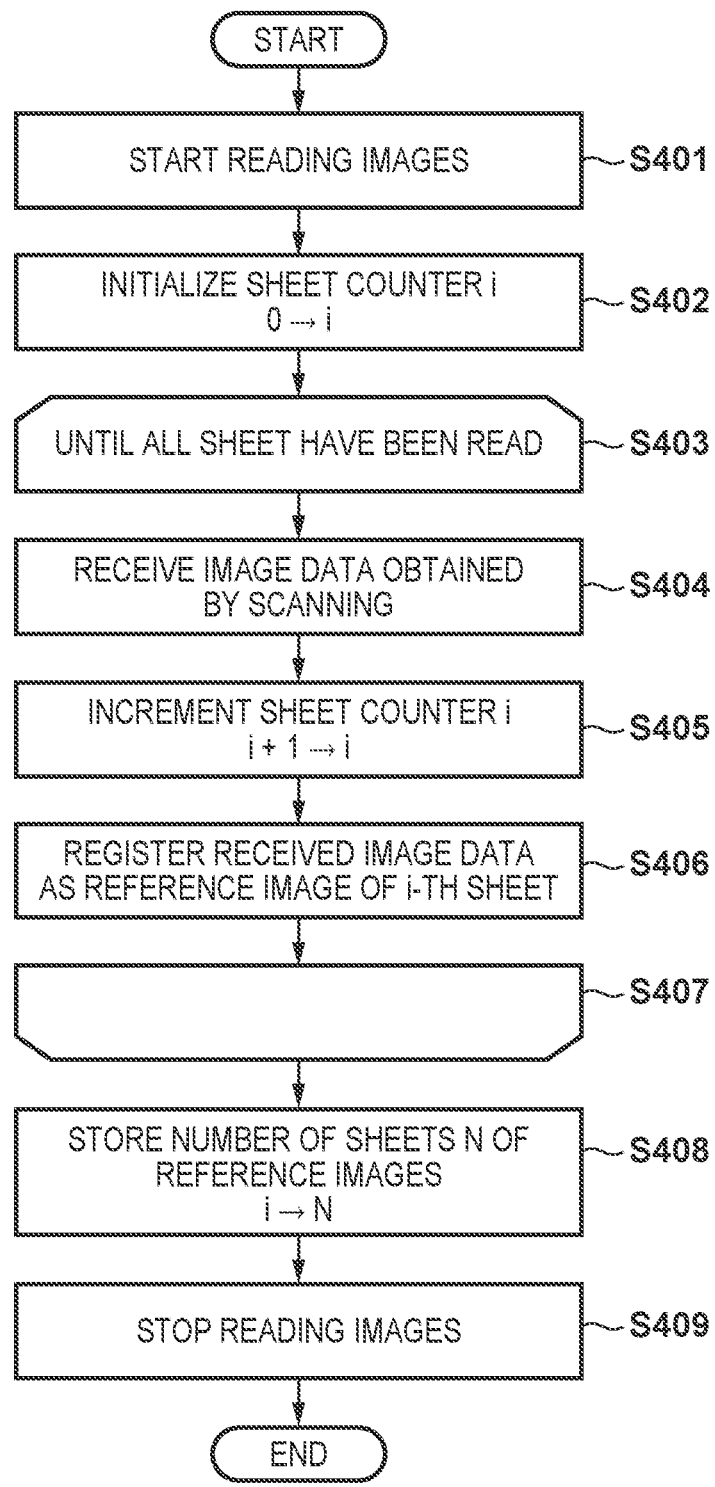
FIG. 4 is a flowchart for describing a process for when the verification apparatus according to the embodiment registers a reference images.

FIG. 4 is a flowchart for describing a process for when the verification apparatus 109 according to the embodiment registers reference images (correct images).

First, in step S401, when the CPU 226 receives an instruction from the user to start reading images via a verification button (not illustrated) displayed on the display unit 245, the CPU 226 advances the process to step S402. In step S402, the CPU 226 initializes a sheet counter i, which counts the number of sheets to be read, to "0". The sheet counter i is a counter for counting the sheets that have passed through the verification unit 108 and is provided in the RAM 227. Note that, in the embodiment, description will be made with the unit to be counted as the sheet; however, the unit to be counted may be another unit such as a page.

Then, the process proceeds to step S403, and if there is sheet for which an image is to be read, the process proceeds to step S404. In step S404, the CPU 226 receives, via the verification unit I/F 231 and the verification apparatus I/F 215, image data obtained by scanning with the CIS 315 and the CIS 316 of the verification unit 108 the sheet on which an image has been printed. In step S405, the CPU 226 increments the sheet counter i by 1 and the process proceeds to step S406, and then the CPU 226 stores the image data received in step S404 in the RAM 227 as a reference image. At this time, the sheet number of the image being registered as the reference image is also stored at the same time. For this sheet number, the value of the sheet counter i is used. Then, the process proceeds to step S407, and the CPU 226 repeats the process of step S403 through step S407 until images of all the sheets have been read. Once the images of all the sheets have thus been read, the process proceeds to step S408.

In step S408, the CPU 226 stores in the storage unit 228 the number of sheets (N) used for registering the reference images. For this number of sheets (N) of reference images, the values of the sheet counter i are used. The reference images registered here are always only the images of the original print job regardless of the number of copies printed when executing verification. For example, when reference images are registered for a print job in which printing is performed on 5 sheets, only 5 sheets of image data are registered as reference images even if, for example, 3 copies are printed to form a total of 15 sheets when executing verification. Therefore, for the number of sheets (N) of reference images, the number of sheets in one copy is stored. A method of comparing reference images and scanned image data when executing verification will be described later with reference to FIG. 5. Then, in step S409, the CPU 226 receives an instruction from the user to stop reading images via the display unit 245 and then terminates the process.

The example illustrated here is an example; for example, the user's instruction on the display unit 245 to start reading images may be performed automatically in conjunction with an instruction in the printing apparatus 101, the information processing apparatus 118, or the client PC 120 to start printing, and the form thereof is not limited. Further, the user's instruction on the display unit 245 to stop reading images may be performed automatically in conjunction with the end of printing in the printing apparatus 101, and the form thereof is not limited. Further, for example, a configuration in which the verification apparatus 109 reads an image of the same sheet a plurality of times, composites the image data of the plurality of times, and registers the result as a reference image may be taken.

By this process, the verification apparatus 109 can cause the verification unit 108 to read a sheet on which an image to be a reference image is printed and register the scanned image data as a reference image.

Figure 5:
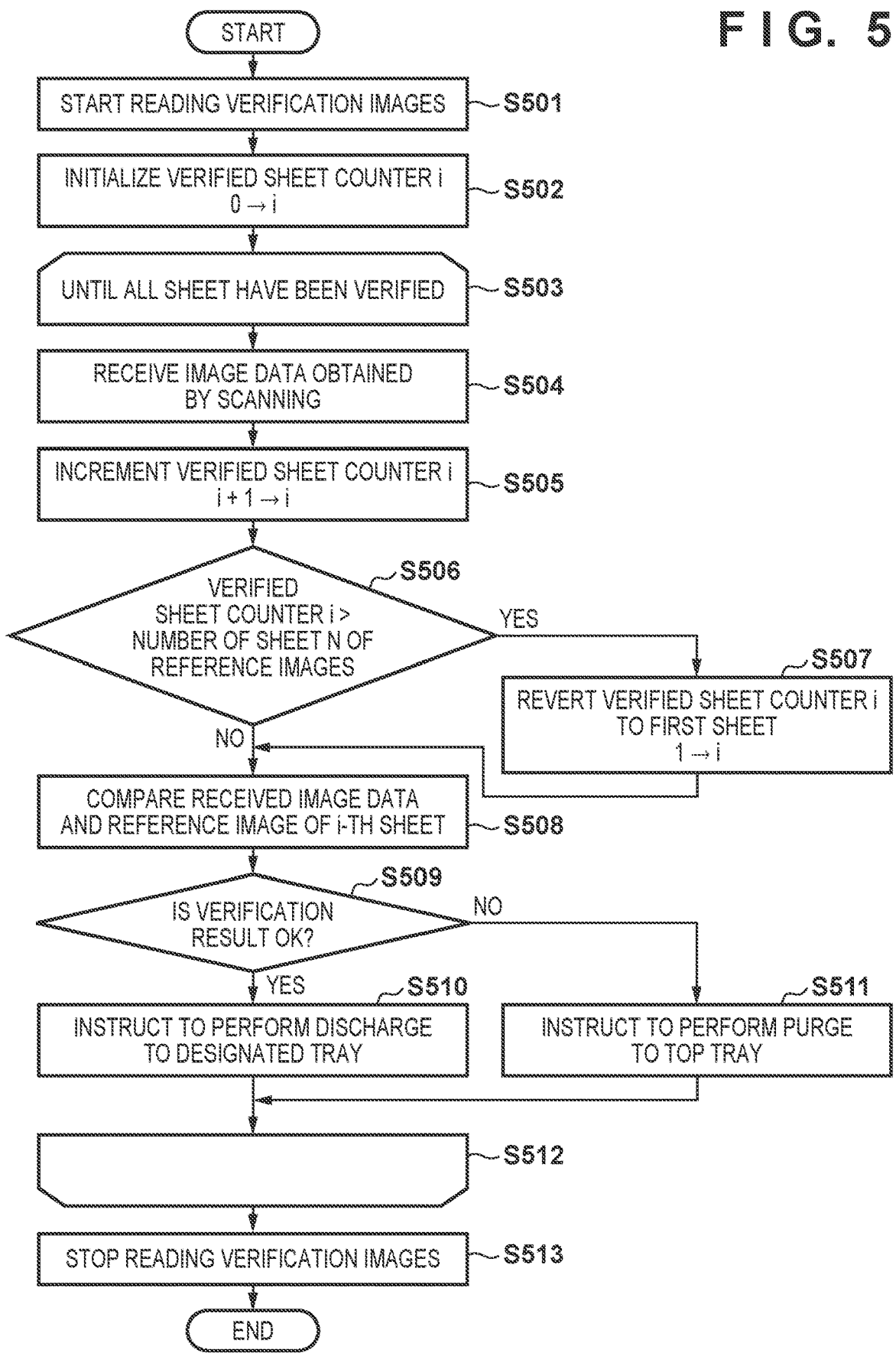
FIG. 5 is a flowchart for describing a basic operation for when the verification apparatus according to the embodiment executes verification.

FIG. 5 is a flowchart for describing a basic operation for when the verification apparatus 109 according to the embodiment executes verification.

In step S501, the CPU 226, upon receiving an instruction from the user via the display unit 245 to start reading images to be verified, the process proceeds to step S502, and then the CPU 226 initializes a verified sheet counter i. This verified sheet counter i is a counter for counting the sheets that have passed through the verification unit 108 and is provided in the RAM 227. Note that, in the embodiment, description will be made with the unit to be counted as the sheet; however, the unit to be counted may be another unit such as the page.

Then, the process proceeds to step S503, and if there is sheet to be verified, the process proceeds to step S504. In step S504, the CPU 226 receives, via the verification unit I/F 231 and the verification apparatus I/F 215, image data obtained by scanning with the CIS 315 and the CIS 316 the sheet to be verified. Then, the process proceeds to step S505 and the CPU 226 increments the verified sheet counter i by 1. Next, the process proceeds to step S506 and the CPU 226 compares the value of the verified sheet counter i with the number of sheets (N) of the reference images stored in step S408 of FIG. 4. Here, if the value of the verified sheet counter i has exceeded the number of sheets (N) of the reference images, the process proceeds to step S507, the value of the verified sheet counter i is reverted to "1", and the process proceeds to step S508. On the other hand, if the verified sheet counter i is less than or equal to the number of sheets (N) of reference images in step S506, the process proceeds to step S508. As described in FIG. 4, the image data corresponding to one copy is always registered as reference images. Therefore, the sheet of the second and subsequent copies repeatedly use the image data of one copy registered as the reference images. Here, in order to repeatedly use the reference images, the verified sheet counter i is updated in step S506 and step S507.

In step S508, the CPU 226 compares the reference image of an i-th sheet stored in the RAM 227 with the scanned image data of the sheet to be verified received in step S504. As described above, assumed that this reference image is the sheet printed by the printing apparatus 101, scanned by the CISs 315 and 316 of the verification unit 108, transmitted from the verification apparatus I/F 215 to the verification apparatus 109 via the verification unit I/F 231, and then stored in the RAM 227 in advance, prior to the start of the processing. In this comparison operation, first, the image positions of the reference image and the scanned image data to be verified are aligned using a characteristic point of the image as a reference point for alignment. Next, in the scanned image data to be verified, the four corners of the sheet and the alignment reference point of the scanned image data are analyzed to detect whether there is a positional shift in the image with respect to the sheet. Next, the density values of the reference image and the scanned image data to be verified are compared for each pixel. If no defect is detected as a result of the above, the verification result is OK. In the RAM 227, a storage destination of the reference image to be compared with the image data obtained by scanning with the CIS 315 and a storage destination of the reference image to be compared with the image data obtained by scanning with the CIS 316 are separately allocated. It is assumed that the verification apparatus 109 reads the reference image by referring to a predetermined storage destination in accordance with the CIS of the comparison target. That is, the order of the image data obtained by scanning corresponds to the order of the corresponding reference images to be compared thereto.

In step S509, the CPU 226 thus determines whether the verification result is OK, that is, whether or not the image data obtained by scanning is good, and if the verification result is OK, the process proceeds to step S510. In step S510, the CPU 226 notifies the verification unit 108 that the verification result is OK via the verification unit I/F 231 and the verification apparatus I/F 215. By thus notifying the verification unit 108 that the verification result is OK, the verification unit 108 can instruct in step S607 (FIG. 6), which will be described later, to discharge the verified sheet to the tray specified in the print job.

On the other hand, in step S509, the process proceeds to step S511 when it is determined that the verification result is NG. In step S511, the CPU 226 notifies the verification unit 108 that the verification result is NG via the verification unit I/F 231 and the verification apparatus I/F 215. By notifying the verification unit 108 that the verification result is NG, the verification unit 108 can instruct in step S606 (FIG. 6), which will be described later, to discharge the verified sheet to the top tray 113 of the large-volume stacker 111. Then, the process of step S503 to step S512 is repeated until all the sheet have been verified. Once all the sheets have been verified, the process proceeds to step S513, and the CPU 226 receives an instruction from the user via the display unit 245 to stop reading images and terminates the reading of images.

Note that the example described here is an example; for example, the user's instruction on the display unit 245 to start reading images may be performed automatically in conjunction with an instruction in the printing apparatus 101, the information processing apparatus 118, or the client PC 120 to start printing, and the configuration thereof is not limited. Further, the user's instruction via the display unit 245 to stop reading images may be performed automatically in conjunction with the end of printing in the printing apparatus 101, and the configuration thereof is not limited.

By the above-described processing, the verification apparatus 109 compares the image data of the sheet to be verified read by the verification unit 108 with the reference image to determine whether the image of each sheet is appropriate, and can instruct the sheet determined to be inappropriate to be discharged to another tray.

FIG. 6 is a flowchart for describing a process for when the verification unit 108 according to the embodiment executes verification.

In step S601, the CPU 216 receives an instruction to start verification from the verification apparatus 109. Then, the process proceeds to step S602, and if there is a sheet to be verified, the process proceeds to step S603. In step S603, the CPU 216 scans with the CIS 315 and the CIS 316 the image on the sheet that has been printed and conveyed. Then, the process proceeds to step S604 and the CPU 216 transmits the image data obtained by scanning to the verification apparatus 109 via the verification apparatus I/F 215 and the verification unit I/F 231. Then, the process proceeds to step S605, the CPU 216 receives the verification result from the verification apparatus 109 via the verification apparatus I/F 215 and the verification unit I/F 231, and determines whether the result thereof is NG. If the result is NG, the process proceeds to step S606 and the CPU 216 instructs via the accessory I/Fs 214, 220, and 255 to discharge, to the top tray 113, the sheet whose verification result is NG and all the sheets thereafter that have already been fed from the sheet-feed decks 103 and 104 and are in the sheet conveyance path. On the other hand, if the verification result is not NG in step S605, the process proceeds to step S607, and the CPU 216 instructs, via the accessory I/Fs 214 and 220, the sheet to be discharged to the discharge destination specified in the print job. Then, the process of step S602 through step S608 is repeated until all the sheets have been verified.

The verification unit 108 thus reads the image of the sheet to be verified according to an instruction of the verification apparatus 109 and can specify discharge destination of the sheet according to the verification result of the image data.

In the following, a specific embodiment for changing the discharge destination of sample printing according to the device configuration of the printing apparatus will be described.

First Embodiment

In the first embodiment, a configuration will be described in which the information processing apparatus 118 determines the device configuration of the printing apparatus 101 and changes the discharge destination of sample printed sheets when verification is executed by the verification apparatus 109.

FIGS. 7A to 7C depict views illustrating examples of information for the information processing apparatus 118 according to the first embodiment to manage the device configuration of the printing apparatus 101. Incidentally, these pieces of information are stored in the storage unit 236 of the information processing apparatus 118.

FIG. 7A shows an example of unit information 700 and illustrates a table representing a list of units connectable to the printing apparatus 101 and the information of a discharge tray provided for the unit. The unit information 700 is information that the information processing apparatus 118 and the printing apparatus 101 statically hold in the storage unit 228 and the storage unit 205, respectively. A unit name 701 indicates the name of each unit. A unit ID 702 is an ID (identification information) that is uniquely assigned to each unit. For example, "Unit1" is assigned to the adjustment unit 106, and the unit ID "Unit4" is assigned to the large-volume stacker. A discharge tray name 703 indicates the name of a discharge tray provided for each unit. A discharge tray ID 704 is a unique ID assigned to each discharge tray. For example, "Tray1" is assigned to the top tray 107 of the adjustment unit 106, and "Tray4" is assigned to the main tray 112 of the large-volume stacker 111. Note that, with respect to units that are not provided with a discharge tray such as the verification unit 108, information (N/A in the first embodiment) indicating that a discharge tray is not provided is assigned to the discharge tray name 703 and the discharge tray ID 704. Also, the unit information 700 is sorted from the top in order of connection to the printing apparatus 101 from the upstream side. In the unit information 700, the adjustment unit 106 is a unit that is connected on the most upstream side, and the staple unit 114 is a unit that is connected on the most downstream side.

A list of connected units 710 in FIG. 7B is information representing a list of units connected to the printing apparatus 101 of FIG. 1A.

The list of connected units 710 is dynamic information and is obtained from the printing apparatus 101 when the information processing apparatus 118 is started. The printing apparatus 101 identifies the type of each unit via the accessory I/Fs 208, 255, 214, 220, and 249 upon receiving, from the information processing apparatus 118, a request to obtain the list of connected units 710. Then, the printing apparatus 101 transmits the information to the information processing apparatus 118 as the list of connected units 710. A unit name 711 indicates the name of each unit assigned by the unit information 700. A unit ID 712 indicates the ID of each unit assigned by the unit information 700. Further, the adjustment unit 106, the verification unit 108, the large-volume stacker 111, and the staple unit 114 are connected to the printing apparatus 101. Therefore, the adjustment unit, the verification unit, the large-volume stacker, and the staple unit are listed in the list of connected units 710. In the first embodiment, both pieces of information of the unit name and the unit ID are included in the list of connected units 710; however, even if only one piece of information is included, it is possible to identify the other piece of information using the unit information 700, so only one piece of information needs to be included.

A list of connected units 720 in FIG. 7C is information representing a list of units connected to the printing apparatus 101 of FIG. 1B.

A unit name 721 and a unit ID 722 are respectively the same as the unit name 711 and the unit ID 712, so the description thereof will be omitted. The printing apparatus 101 of FIG. 1B is connected with the verification unit 108, the large-volume stacker 111, and the staple unit 114. Therefore, the verification unit, the large-volume stacker, and the staple unit are listed in the list of connected units 720.

Figure 8:
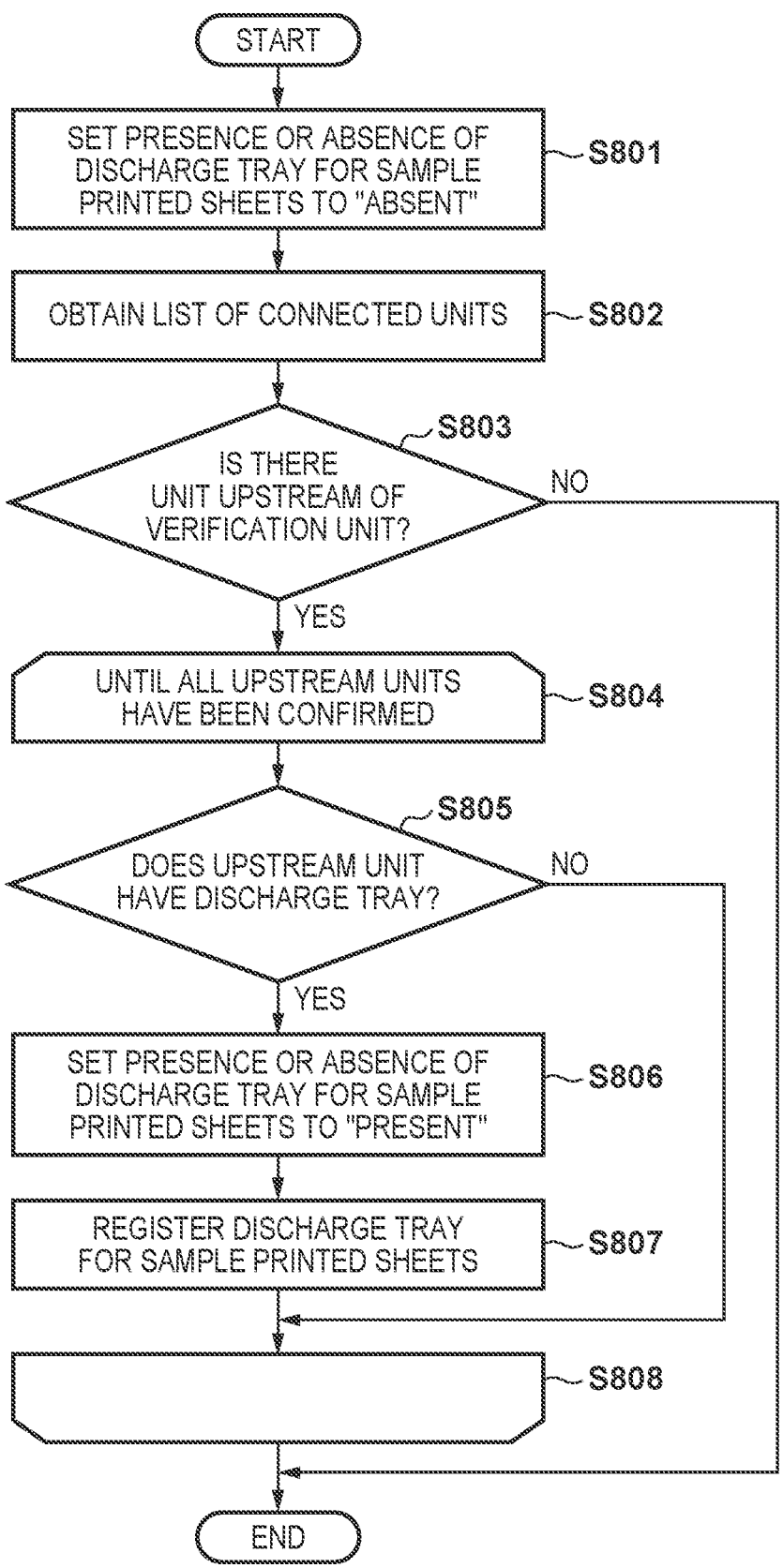
FIG. 8 is a flowchart for describing an operation for when the information processing apparatus according to the first embodiment acquires the device configuration of the print system.

FIG. 8 is a flowchart for describing an operation for when the information processing apparatus 118 according to the first embodiment obtains the device configuration of the print system. Processing described in this flowchart is started when the information processing apparatus 118 starts up.

In step S801, the CPU 234 sets, as an initial setting, the presence or absence of the discharge tray for sample printed sheets to "absent". The information indicating the presence or absence of the discharge tray for sample printed sheets is stored in the storage unit 236 and is used to determine the presence or absence of the discharge tray for discharging sample printed sheets when executing sample printing while executing verification. Then, the process proceeds to step S802, and the CPU 234 obtains the list of connected units 710 or 720 from the printing apparatus 101. Then, the process proceeds to step S803, and the CPU 234 determines whether an upstream unit is interposed between the printing apparatus 101 and the verification unit 108. The presence or absence of the upstream unit is determined by cross-referencing the list of connected units obtained in step S802 and the unit information 700 held in the storage unit 236 by the information processing apparatus 118.

First, a device configuration in which the adjustment unit 106, the verification unit 108, the large-volume stacker 111, and the staple unit 114 are connected to the printing apparatus 101 described in FIG. 1A will be described as an example. In this device configuration, the list of connected units 710 of FIG. 7B is obtained as the list of connected units.

The CPU 234 compares the unit ID of the list of connected units 710 with the unit ID of the unit information 700 and extracts corresponding units from the unit information 700. The units extracted from the unit information 700 are the adjustment unit (Unit1), the verification unit (Unit2), the large-volume stacker (Unit4), and the staple unit (Unit6) in order from the top. As described above, the unit information 700 is sorted from the top in order of connection from the upstream side seen from the printing apparatus 101. Therefore, if there is a unit above the row of the verification unit (Unit2) of the unit information 700, that means that a unit is present upstream of the verification unit 108. In the example of the list of connected units 710, it can be seen that there is the adjustment unit (Unit1) upstream of the verification unit (Unit2). Therefore, in the device configuration described in FIG. 1A, it is determined that there is a unit upstream of the verification unit 108 (Yes in step S803).

Next, a device configuration in which the verification unit 108, the large-volume stacker 111, and the staple unit 114 are connected to the printing apparatus 101 described in FIG. 1B will be described as an example. In this device configuration, the list of connected units 720 of FIG. 7C is obtained as the list of connected units. As in the case of the list of connected units 710, by cross-referencing the list of connected units 720 and the unit information 700, it is determined whether there is a unit upstream of the verification unit 108. Since the verification unit (Unit2) is at the top when the unit that matches the list of connected units 720 is extracted from the unit information 700, it can be seen that there is no unit upstream of the verification unit 108. Therefore, in the device configuration described in FIG. 1B, it is determined that there is no unit upstream of the verification unit 108 (No in step S803).

Whether there is a unit upstream of the verification unit 108 is determined as described above, and if it is determined that there is a unit on the upstream side, the process proceeds to step S804, and if it is determined that there is no unit on the upstream side, the process ends.

In step S804, the CPU 234 repeats the subsequent processing until all units upstream of the verification unit 108 are confirmed. In step S805, the CPU 234 determines whether a unit upstream of the verification unit 108 has a discharge tray. Here, for the unit upstream of the verification unit identified in step S803, the unit information 700 is referred to and a unit whose discharge tray ID 704 is not N/A is identified. In the device configuration described in FIG. 1A, the presence or absence of the discharge tray is determined for the adjustment unit (Unit1) upstream of the verification unit (Unit2). According to the unit information 700, it can be seen that the adjustment unit (Unit1) is provided with the top tray 107 (Tray1). Therefore, it is determined that there is a discharge tray in the upstream unit, and the process proceeds to step S806. Meanwhile, if it is determined that there is no discharge tray in the upstream unit, the process proceeds to step S808.

In step S806, the CPU 234 sets the presence or absence of the discharge tray for sample printed sheets to "present". Next, the process proceeds to step S807, and the CPU 234 registers the discharge tray determined in step S805 as the discharge tray for sample printed sheets and stores it in the storage unit 236. The discharge tray for sample printed sheets refers to the discharge tray to which the printing apparatus 101 is caused to discharge sample printed sheets when sample printing is executed. In the first embodiment, the discharge tray (top tray 107) of the adjustment unit 106 that is upstream of the verification unit 108 is registered as the discharge tray for sample printed sheets. Then, step S804 to step S808 are repeated until all units upstream of the verification unit 108 are confirmed.

In this way, the information processing apparatus 118 determines whether or not there is a unit having a discharge tray upstream of the verification unit 108, and if so, that discharge tray can be registered as the discharge tray for sample printed sheets.

Figure 9A:
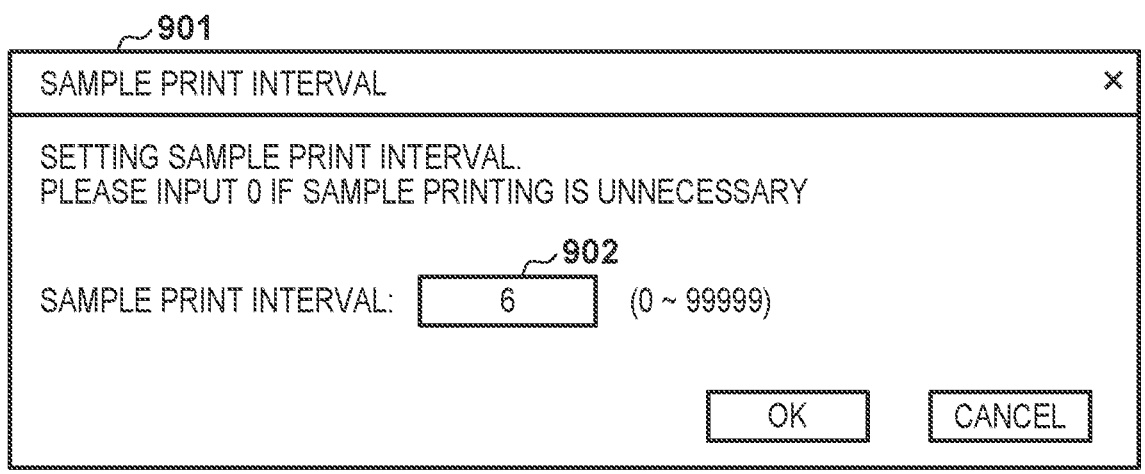
FIG. 9A and FIG. 9B depict views illustrating examples of a sample print setting screen created in the information processing apparatus according to the first embodiment and displayed on an operation panel of the printing apparatus.
Figure 9B:
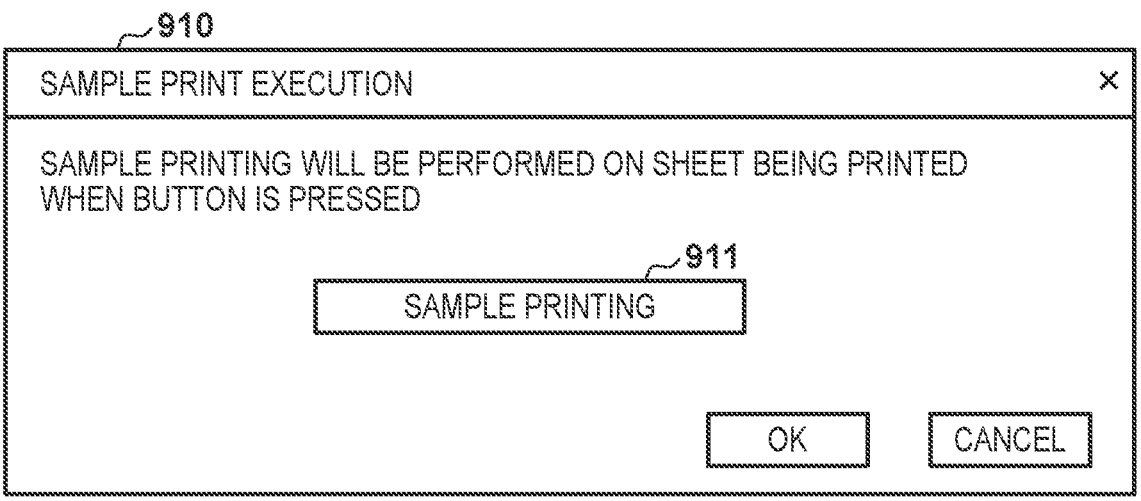

FIGS. 9A and 9B depict views illustrating examples of sample print setting screens created in the information processing apparatus 118 according to the first embodiment and displayed on the operation panel 203 of the printing apparatus 101. The information of these screens is generated by the CPU 234 of the information processing apparatus 118, transmitted to the printing apparatus 101 via the NW I/Fs 238 and 207, and displayed on the operation panel 203.

A sample print interval setting screen 901 of FIG. 9A is a screen for setting execution intervals for sample printing. The information processing apparatus 118 performs sample printing at intervals of a sample print interval 902 entered by the user. As illustrated in FIG. 9A, when "6" is inputted as the sample print interval 902, the information processing apparatus 118 duplicates the image data of the sixth sheet each time six sheets are printed and executes sample printing. When not performing sample printing, the user enters "0" as the sample print interval 902.

A sample print execution screen 910 of FIG. 9B is a screen for executing sample printing by pressing a button. The information processing apparatus 118 executes sample printing when a sample print button 911 is pressed.

The sample print interval setting screen 901 is used by a function in which the information processing apparatus 118 automatically performs sample printing at a periodic timing inputted by the user. On the other hand, the sample print execution screen 910 of FIG. 9B is a screen for the user to perform sample printing at an arbitrary timing during a print job. Flowcharts of sample print operations executed by the sample print interval setting screen 901 and the sample print execution screen 910 will be described later with reference to FIGS. 10A and 10B.

Figure 10A:
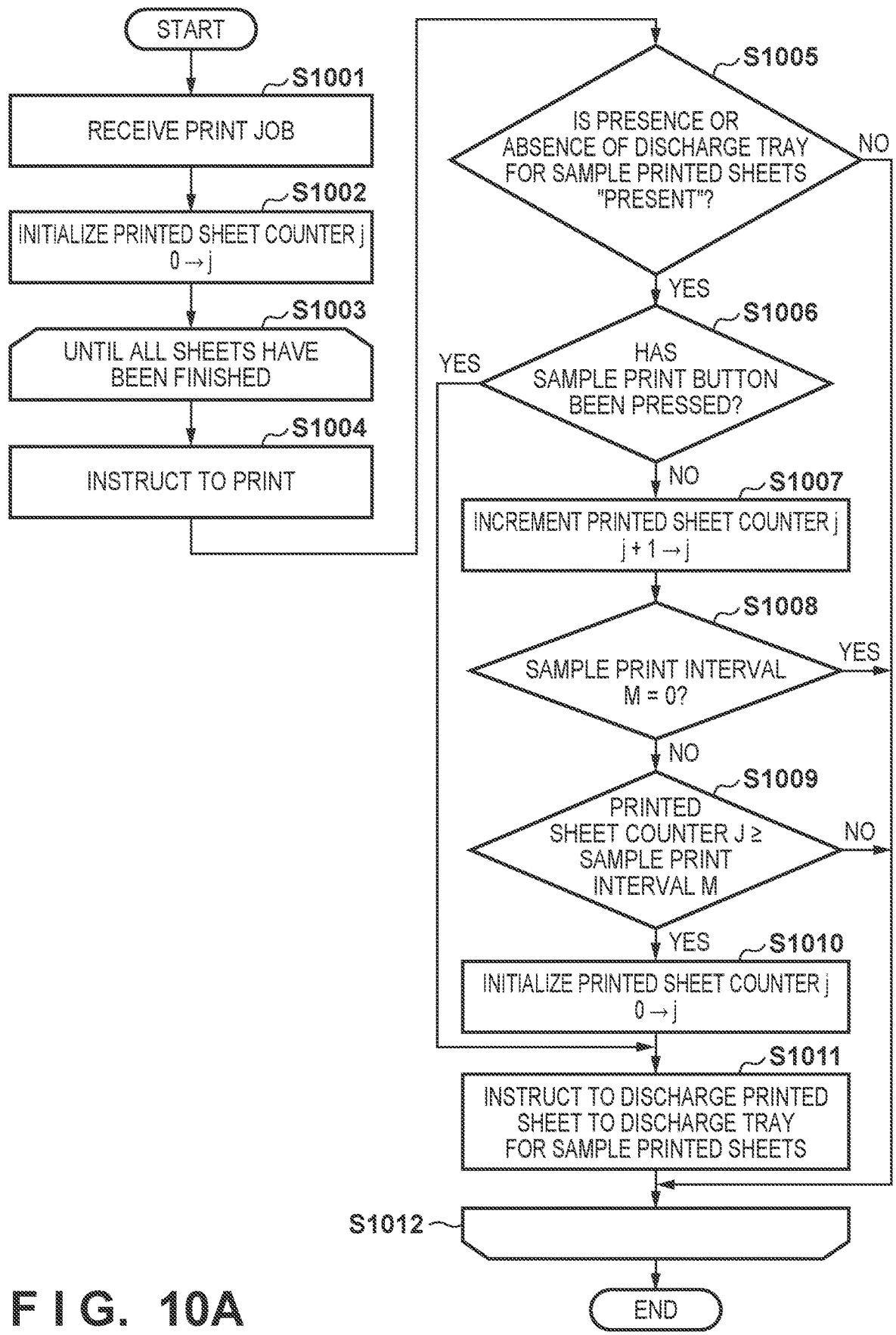
FIGS. 10A and 10B are flowcharts for describing processes for when the information processing apparatus according to the first embodiment executes a print job.

FIG. 10A is a flowchart for explaining a process for when the information processing apparatus 118 according to the first embodiment executes a print job. Processing described in this flowchart is started by the information processing apparatus 118 receiving a print job.

First, the CPU 234 receives a print job in step S1001. This print job includes job setting information and image data. Next, the process proceeds to step S1002, and the CPU 234 initializes a printed sheet counter j, which counts the number of printed sheets, to "0". The printed sheet counter j is stored in the RAM 235. Note that, in the first embodiment, description will be made with the unit to be counted as the sheet; however, the unit to be counted may be another unit such as a page.

Next, the process proceeds to step S1003, and if there is a sheet to be printed, the process proceeds to step S1004. In step S1004, the CPU 234 issues a print instruction for one sheet to the printing apparatus 101. Further, the job setting information such as the post-processing setting and the discharge destination tray is transmitted to the printing apparatus 101 via the NW I/Fs 238 and 207. The image data used for printing is also transmitted to the printing apparatus 101 via the video I/Fs 233 and 206. The operation of the printing apparatus 101 that has received the job setting information and the image data will be described in FIG. 11.

In step S1005, the CPU 234 reads the information indicating the presence or absence of the discharge tray for sample printed sheets stored in step S801 or step S806, and determines whether or not the discharge tray for sample printed sheets is "present". Here, when it is determined "present", the process proceeds to step S1006, and when it is determined "absent", the process proceeds to step S1012. In step S1006, the CPU 234 determines whether or not the sample print button 911 of the sample print execution screen 910 of FIG. 9B has been pressed. When it is determined that the sample print button 911 has been pressed, the process proceeds to step S1011 to perform sample printing.

Meanwhile, when it is determined that the sample print button 911 has not been pressed, the process proceeds to step S1007 to determine the execution timing for sample printing by the sample print interval setting screen 901. In step S1007, the CPU 234 increments the printed sheet counter j by 1 and then the process proceeds to step S1008. In step S1008, the CPU 234 determines whether a sample print interval M is 0 and the process proceeds to S1012 if the sample print interval M is 0, or the process proceeds to S1009 otherwise. In step S1009, the CPU 234 compares the value of the printed sheet counter j with the sample print interval M inputted in the sample print interval 902. When it is determined that the value of the printed sheet counter j is equal to or greater than the sample print interval M, the process proceeds to step S1010, the printed sheet counter j is returned to 0, and the process proceeds to step S1011. In step S1011, the CPU 234 causes the printing apparatus 101 to perform sample printing. Meanwhile, when the CPU 234 determines in step S1009 that the value of the printed sheet counter j is less than the sample print interval M, the CPU 234 skips the sample printing of step S1011 and the process proceeds to step S1012. In step S1011, the CPU 234 instructs the printing apparatus 101 to discharge the printed sheet to the discharge tray for sample printed sheets registered in step S807 of FIG. 8 described above.

Here, when printing on a sheet to be discharged to the discharge tray for sample printed sheets, the job setting information and the image data for one sheet transmitted to the printing apparatus 101 in step S1004 are transmitted again to the printing apparatus 101 in order to use them. At this time, the discharge destination tray in the job setting information is overwritten with the discharge tray for sample printed sheets registered in step S807 and then transmitted. In this way, the sample printed sheet can be discharged to the discharge tray for sample printed sheets. An illustration of the result of discharge in which the discharge destination has been switched to the discharge tray for sample printed sheets will be described later with reference to FIG. 12. Then, step S1003 to step S1012 are repeated until all the sheets have been printed.

In FIG. 10A, an example in which sample print instruction is carried out in step S1011 after a print instruction is carried out in step S1004 has been described. That is, a configuration is such that when the sample print button is pressed during the processing of the second sheet, for example, the process proceeds from step S1006 to step S1011 and sample printing of the second sheet is performed. Another configuration such as the example of FIG. 10B can be conceived. Incidentally, in FIG. 10B, parts in common with the above-described FIG. 10A are denoted by the same reference numerals, and their description thereof will be omitted.

Figure 10B:
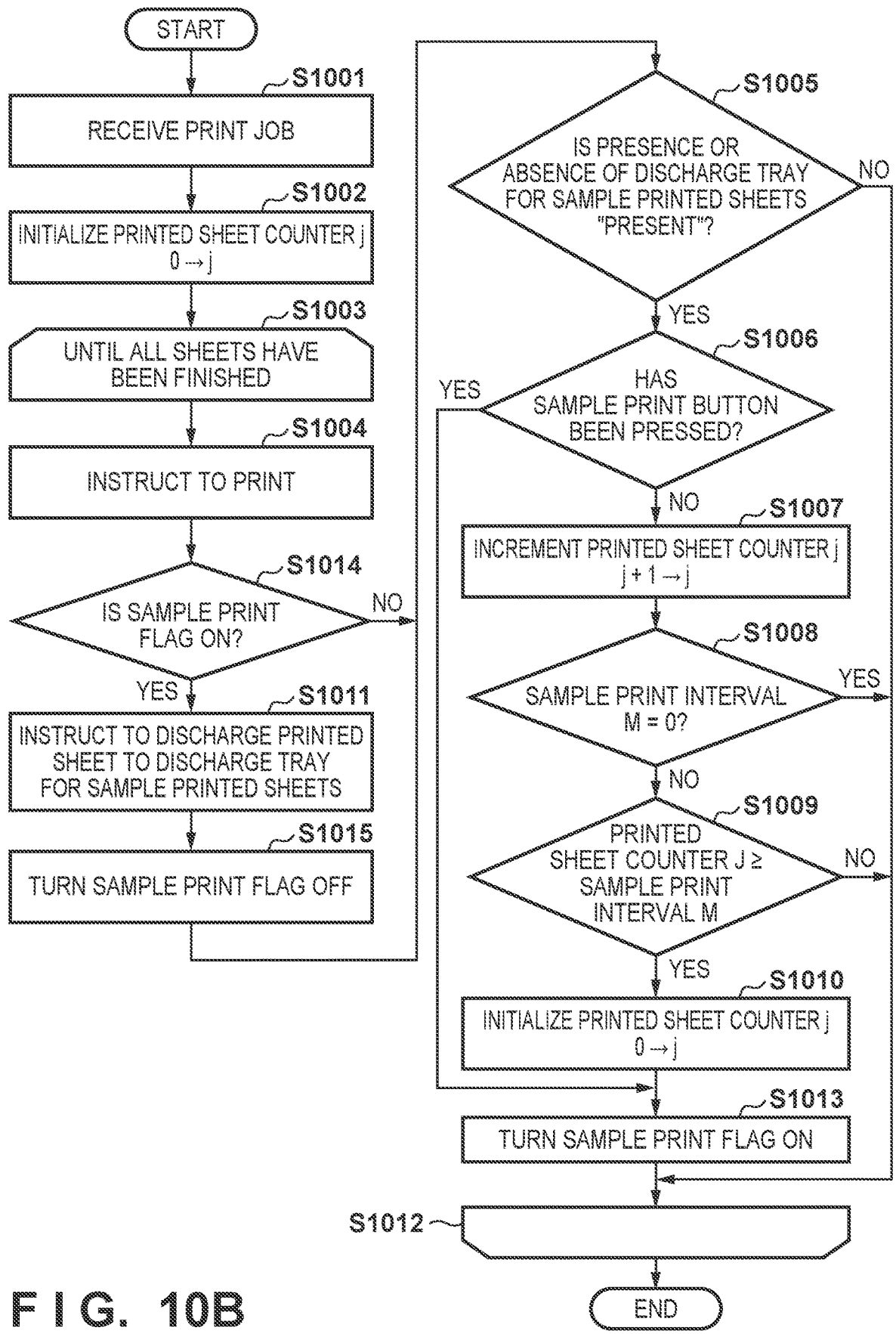

If the sample print button 911 is pressed in FIG. 10B or if the sample print interval reaches a predetermined value, the process proceeds to step S1013, and the CPU 226 sets a sample print flag to ON. This sample print flag is provided in the RAM 235. Then, during the repetitive process until all sheets are completed, when the CPU 234 determines in step S1014 that the sample print flag is on, the process proceeds to step S1011 and the CPU 234 performs sample printing. After performing sample printing in this way, the process proceeds to step S1015 and the CPU 234 sets the sample print flag to OFF. In this way, a configuration in which when the sample print button is pressed during the processing of the second sheet, sample printing is performed on the third sheet is also conceivable.

Incidentally, the printing method of sample printing described here is an example; for example, sample printing may be performed not immediately after but several sheets after the press of the sample print button or the number of printed sheets reaches the sample print interval, and the method thereof is not limited. Further, for example, sample printing may be carried out so as to perform sample printing for sheets of one copy.

By this process, when the presence or absence of the discharge tray for sample printed sheets is "present", sample printing can be executed according to when the sample printing has been instructed or the set interval for sample printing.

FIG. 11 is a flowchart for explaining an operation for when the printing apparatus 101 according to the first embodiment executes a print job. Processing described in this flowchart is started by the printing apparatus 101 receiving a print job from the information processing apparatus 118.

First, in step S1101, the CPU 201 analyzes job setting information included in the print job received from the information processing apparatus 118. The job setting information is received from the information processing apparatus 118 via the NW I/Fs 207 and 238. This job setting information includes post processing settings such as stapling and paper size as well as information on the discharge destination tray. Here, the CPU 201 analyzes the received job setting information and determines the post-processing setting and the discharge destination tray. Next, the process proceeds to step S1102, and the CPU 201 feeds a sheet from the sheet-feed deck 211 via the sheet-feed deck I/F 204. Then, the process proceeds to step S1103, and the CPU 201 controls the printer engine 210 to print on the sheet fed in step S1102. To print on the sheet, the image data of the print job received from the information processing apparatus 118 is used. Then, the process proceeds to step S1104, and the CPU 201 controls the printer engine 210 to discharge the printed sheet to the discharge destination specified in the job setting information. Here, the CPU 201 reads the discharge destination setting from the job setting information analyzed in step S1101 and performs discharge processing to the discharge units 258, 223, and 252 of the set unit via the accessory I/Fs 208, 255, 220, and 249.

Figure 12:
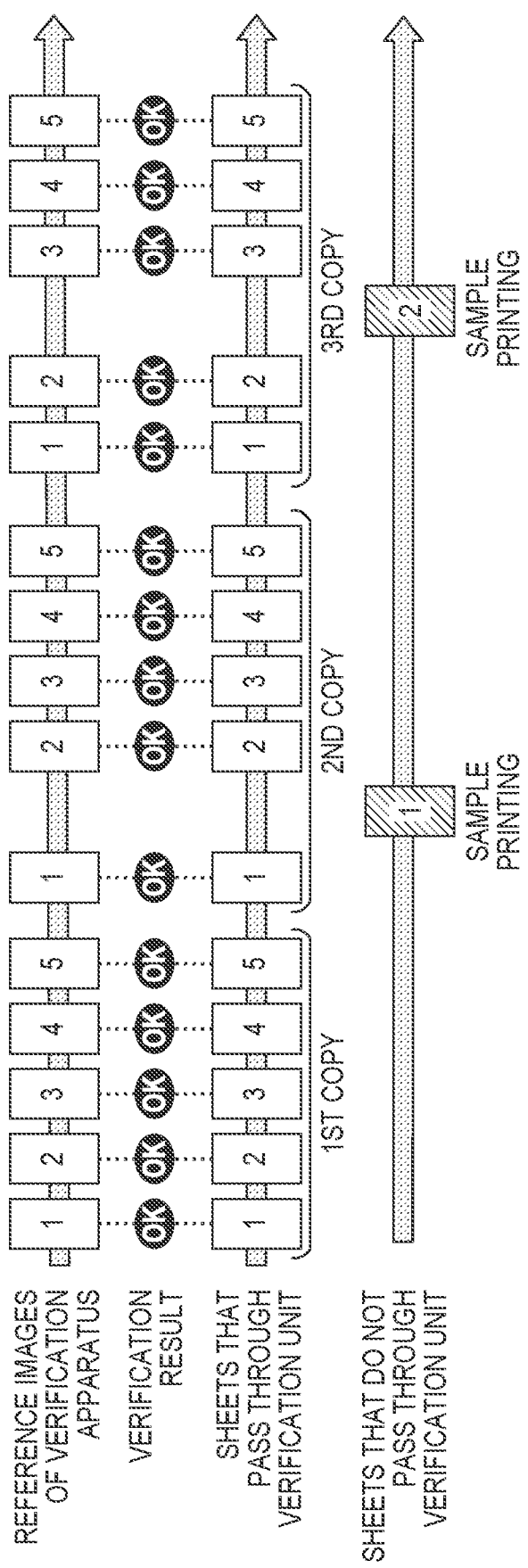
FIG. 12 depicts a conceptual view explaining the order of reference images of the verification apparatus and of a discharge result of the printing apparatus at the time of sample printing in the first embodiment.

FIG. 12 depicts a conceptual view for explaining the order of reference images of the verification apparatus and of a discharge result of the printing apparatus at the time of sample printing in the first embodiment. In the figure, an example in which "6" has been inputted as the sample print interval 902 in FIG. 9A, and a print job in which five sheets and three copies are printed and verified is illustrated.

The verification apparatus 109 compares the reference image of an i-th sheet stored in the RAM 227 and the scanned image data of a verification target received in step S504 of FIG. 5 (step S508 of FIG. 5). As described above, images registered as reference images are always registered as image data of only one copy. Therefore, the reference images used for comparison for the second and third copies in the figure are the same reference images as for the first copy. The scanned image data of the verification target received in step S504 is image data obtained by scanning, with the CIS in step S603 of FIG. 6, the image of the sheet to be verified and is synonymous with the scanned image data of the sheet passing through the verification unit 108. Thus the verification apparatus 109 compares the scanned image data of the sheet passing through the verification unit 108 and the reference image and issues a verification result. In other words, a sheet that does not pass through the verification unit 108 is not compared with the reference image because it is not scanned by the CIS in step S603.

In the example of FIG. 12, one copy comprises five sheets, and since "6" has been inputted to the sample print interval 902 of FIG. 9A, sample printing is executed after the first sheet of the second copy and after the second sheet of the third copy. The sample printed sheet is discharged to the discharge tray for sample printed sheets as described in step S1011 of FIG. 10A. The discharge tray for sample printed sheets is the discharge tray of the unit upstream of the verification unit 108 registered in step S807. Therefore, the sheet after the first sheet of the second copy and the sheet after the second sheet of the third copy, which are sample printed sheets, are discharged to the top tray 107 of the adjustment unit 106. Therefore, the sample printed sheet is not fed to the verification unit 108 and is not compared with the reference image, so an inconsistency with the order of the reference images expected by the verification apparatus 109 does not occur.

According to the first embodiment as described above, even when performing sample printing while executing verification, an inconsistency between the order of the reference images that the verification apparatus 109 expects and the order of the sheets to be verified does not occur. That is, it is possible to perform sample printing while performing verification of the sheet. Therefore, it is possible to solve the problem that the user cannot handle jobs for which both verification and sample printing are valid.

In the first embodiment, the presence or absence of the discharge tray of the unit upstream of the verification unit connected to the printing apparatus is determined, and when the discharge tray is present, the sample printed sheet is discharged to the discharge tray. By excluding the sample printed sheet from the verification target of the verification apparatus in this way by discharging them so as not to pass through the verification unit, it is possible to prevent the occurrence of inconsistency in the order of the reference images and the order of the sheets to be verified. Thus, it is possible to achieve the effect that sample printing can be performed without the verification result becoming NG due to an inconsistency between the order of the reference images and the order of the sheets to be verified.

Second Embodiment

In the first embodiment described above, if the discharge tray for discharging sample printed sheets cannot be used, printing and verification are stopped without notification to the user. On the other hand, in the second embodiment, if the discharge tray for sample printed sheets cannot be used, it is notified to the user that the discharge tray cannot be used, thereby prompting the user to resume printing and verification. Incidentally, the system configuration (FIGS. 1A and 1B), the block configuration (FIG. 2), the internal configuration (FIGS. 3A and 3B), the operation of the verification apparatus (FIG. 4, FIG. 5), the operation of the verification unit (FIG. 6), the processing of obtaining the device configuration (FIG. 8) according to the second embodiment are the same as that of the first embodiment, and so their description thereof will be omitted.

Figure 13:
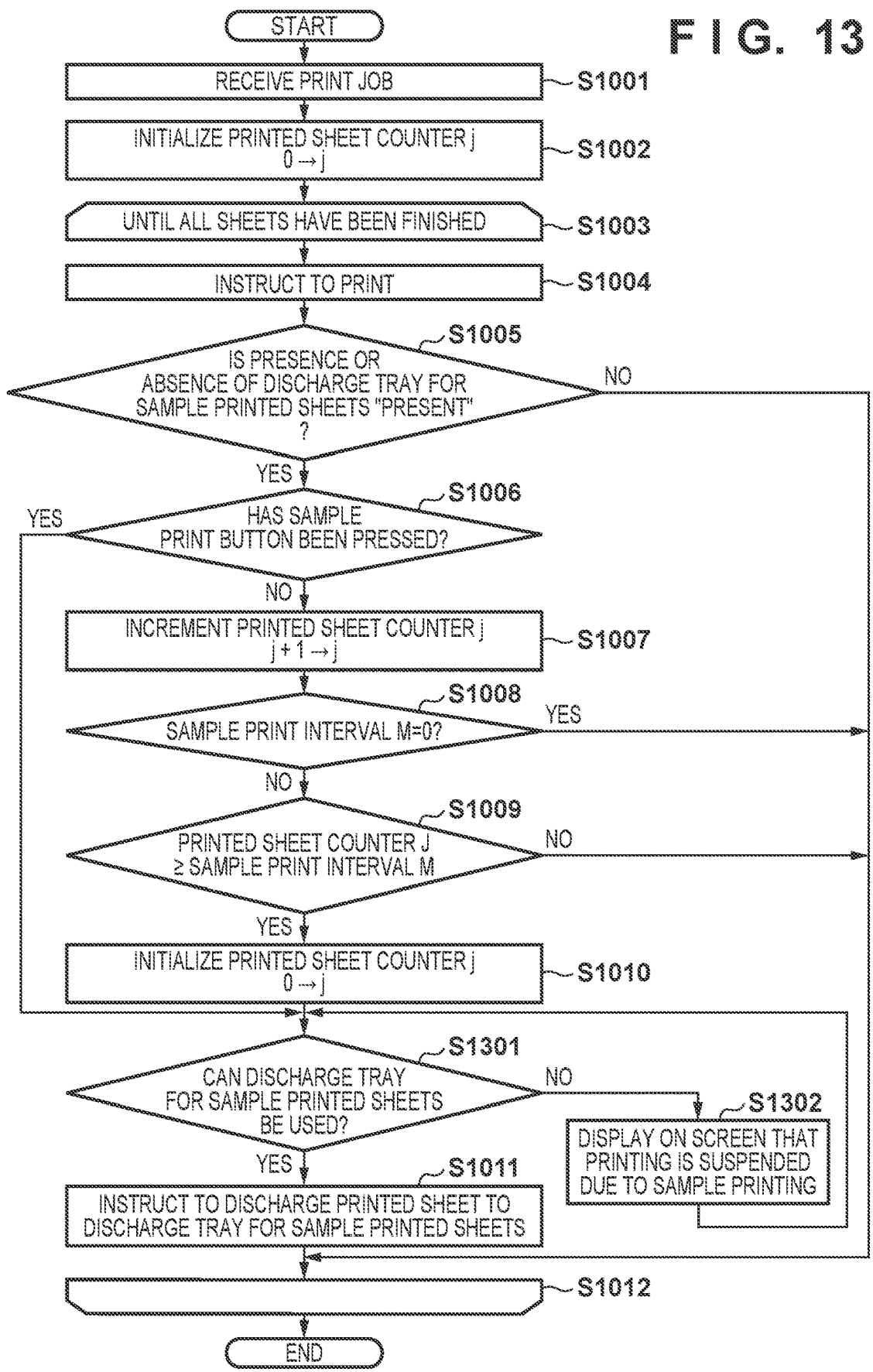
FIG. 13 is a flowchart for describing a process for when the information processing apparatus according to a second embodiment receives and processes a print job.

FIG. 13 is a flowchart for describing a process for when the information processing apparatus 118 according to the second embodiment receives and processes a print job. Processing described in this flowchart is started by the information processing apparatus 118 receiving a print job. Incidentally, in FIG. 13, processing in common with the above-described FIGS. 10A and 10B is denoted by the same reference numerals, and their description thereof will be omitted.

In step S1301, the CPU 234 determines whether or not the discharge tray for discharging sample printed sheets can be used. At this time, the CPU 234 reads information about the discharge tray for sample printed sheets stored in the storage unit 236. Then, the CPU 234 inquires, via NW I/Fs 238 and 207, to the CPU 201 of the printing apparatus 101 as to whether or not the discharge tray registered as the discharge tray can be used. When the CPU 201 of the printing apparatus 101 thus receives the inquiry, it obtains the state of availability of the discharge tray for the unit having the discharge tray through the accessory I/Fs 208, 255, 220, and 249. As for whether or not the discharge tray can be used, the CPU of each unit obtains the stacking status of sheets in the discharge tray and confirms that the stacking upper limit has not been exceeded. If the stacking upper limit has not been exceeded, it is determined that the discharge tray can be used and information indicating that the discharge tray can be used is transmitted to the CPU 201. Meanwhile, if the stacking upper limit has been exceeded, information indicating that the discharge tray cannot be used is transmitted to the CPU 201. The CPU 201 of the printing apparatus 101 that has thus received the information indicating whether the discharge tray can be used or not notifies the CPU 234 of the information processing apparatus 118 of the result indicated by the information through the NW I/Fs 207 and 238.

The CPU 234 of the information processing apparatus 118 thus determines whether the discharge tray for sample printed sheets can be used or not, and when it is determined that the discharge tray for sample printed sheets can be used, the process proceeds to step S1011 to execute the sample printing. On the other hand, in step S1301, when the CPU 234 determines that the discharge tray for sample printed sheets cannot be used, the process proceeds to step S1302. In step S1302, the CPU 234 creates screen information indicating that printing is suspended due to sample printing. The content of this screen will be described later with reference to FIG. 14. The screen information thus created is transmitted to the printing apparatus 101 via the NW I/Fs 238 and 207 and displayed on the operation panel 203 of the printing apparatus 101.

Figure 14:
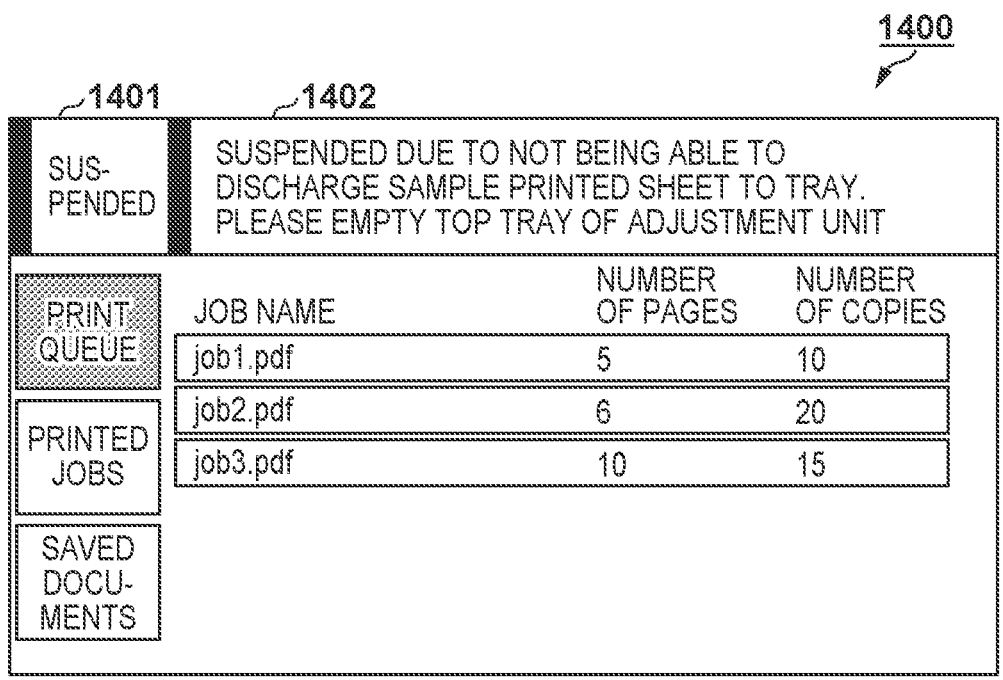
FIG. 14 depicts a view illustrating an example of a screen displayed using screen information that the information processing apparatus creates in step S1302 of FIG. 13.

FIG. 14 depicts a view illustrating an example of a screen displayed using screen information that the information processing apparatus 118 creates in step S1302 of FIG. 13.

A job status screen 1400 displays the execution status of a job in the printing apparatus 101. In FIG. 14, a print queue is displayed, and the names of jobs included in the print queue and the number of pages and the number of copies of each job are displayed. An item 1401 illustrates the operation status of the printing apparatus 101. "Printing" is displayed when printing, "suspended" is displayed when printing is suspended for some reason, and "standby" is displayed when the printing apparatus 101 is not performing the printing process. In step S1302, "suspended" is displayed in the item 1401 because the state is that in which printing is suspended due to sample printing. A message 1402 displays supplementary information on the operation status displayed in the item 1401 in a message format. When printing, a message indicating the progress of printing, such as "printing second copy", for example, is displayed. When printing is suspended, the cause of the printing being suspended and the method for solving that cause are displayed. In step S1302, the state is that in which the discharge tray for sample printing cannot be used due to it exceeding the stacking upper limit, so the message 1402 displays a message that the discharge tray has exceeded the stacking upper limit and is prompting to remove sheets from the discharge tray as a method of resolution.

As described above, in the second embodiment, when the discharge tray for sample printed sheets cannot be used, it is notified to the user that the discharge tray cannot be used, thereby making it possible to prompt the user to resume printing and verification.

Third Embodiment

In the first and second embodiments described above, if there is no discharge tray for sample printed sheets, sample printing is disabled without notification to the user. Conversely, in the third embodiment, when a discharge tray for sample printed sheets is not present and sample printing cannot be performed during verification, the user is notified that sample printing cannot be performed. Incidentally, the system configuration (FIGS. 1A and 1B), the block configuration (FIG. 2), the internal configuration (FIGS. 3A and 3B), the operation of the verification apparatus (FIG. 4, FIG. 5), the operation of the verification unit (FIG. 6), the operation of obtaining the device configuration (FIG. 8) according to the third embodiment are the same as those of the first embodiment, and so their description thereof will be omitted.

Figure 15:
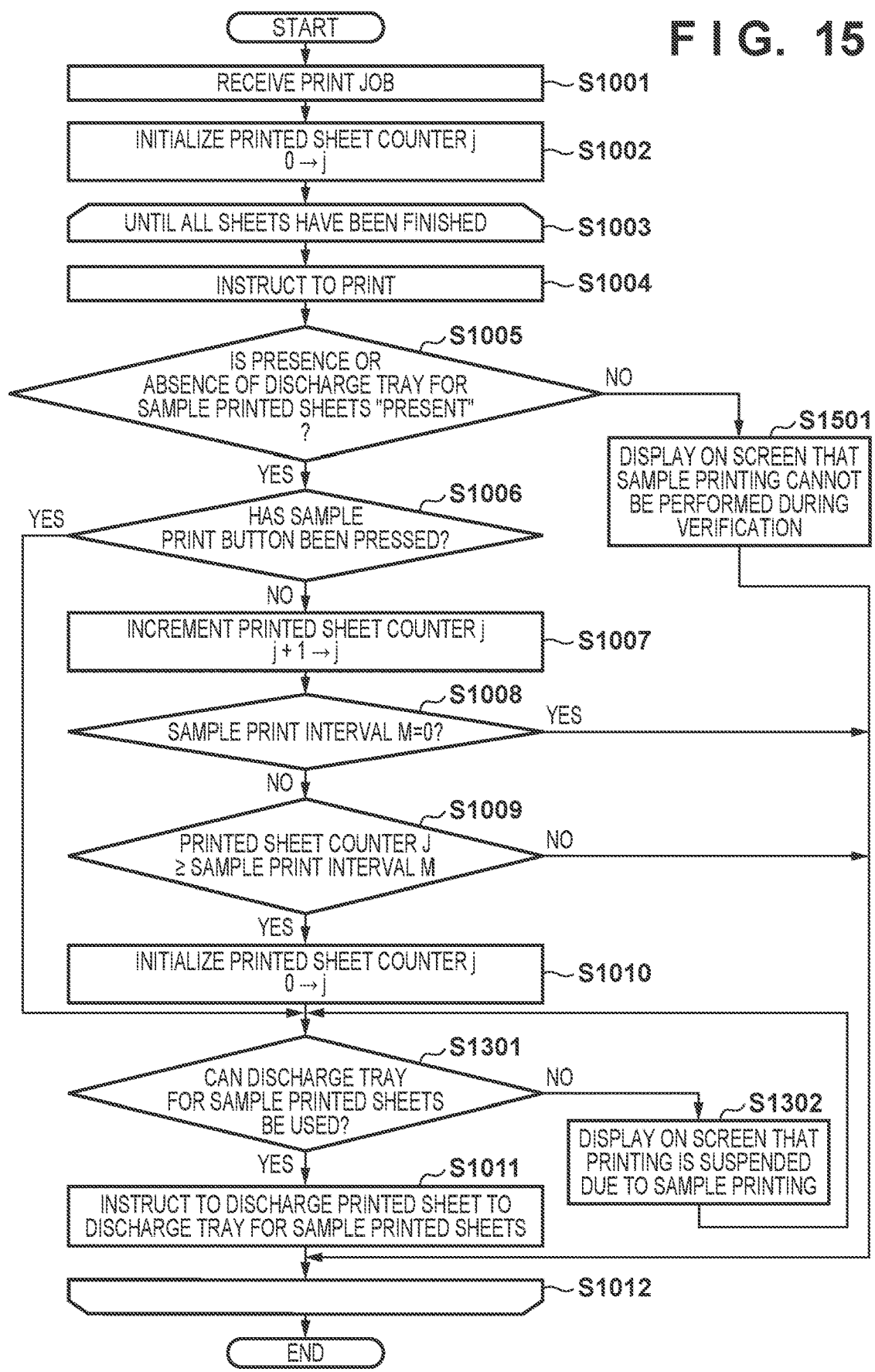
FIG. 15 is a flowchart for describing an operation for when the information processing apparatus according to a third embodiment receives and executes a print job.

FIG. 15 is a flowchart for describing an operation for when the information processing apparatus 118 according to the third embodiment receives and executes a print job. Processing described in this flowchart is started by the information processing apparatus 118 receiving a print job. Incidentally, processing in common with the above-described FIG. 10 and FIG. 13 is denoted by the same reference numerals, and their description thereof will be omitted.

In step S1005, when the CPU 234 determines that the presence or absence of the discharge tray for sample printed sheets is set to "absent", the process proceeds to step S1501. When the presence or absence of the discharge tray for sample printed sheets is set to "absent", it is assumed that the device configuration is that in which the verification unit 108, the large-volume stacker 111, and the staple unit 114 are connected to the printing apparatus 101 illustrated in FIG. 1B.

In step S1501, the CPU 234 creates screen information for a screen which indicates that sample printing cannot be performed while executing verification. The content of the screen information to be created will be described later with reference to FIGS. 16A and 16B. The screen information thus created is transmitted to the printing apparatus 101 via the NW I/Fs 238 and 207 and is displayed on the operation panel 203 of the printing apparatus 101.

Figure 16A:
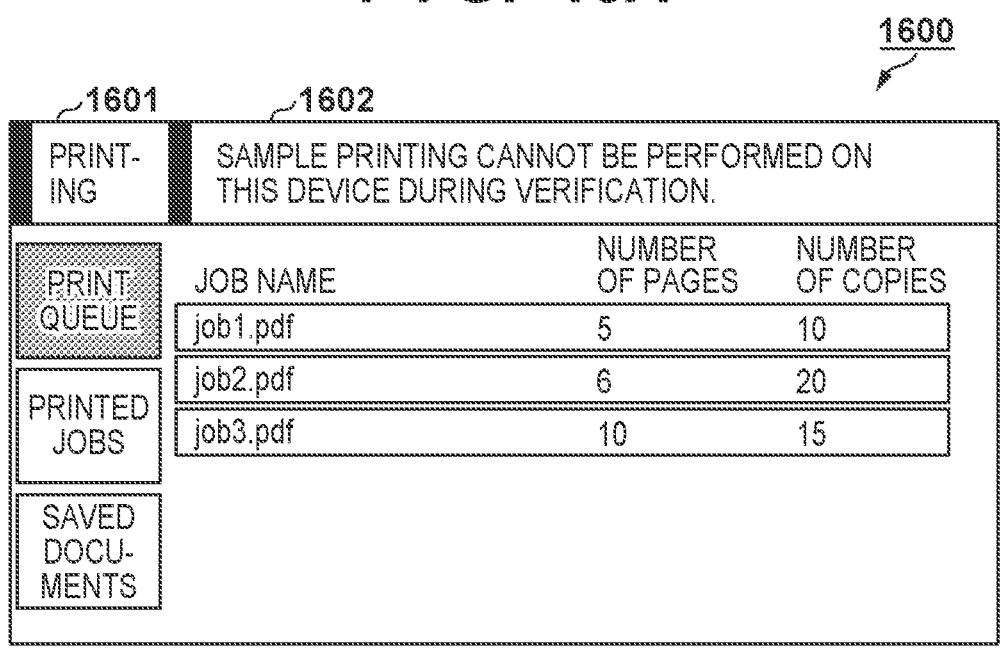
FIGS. 16A and 16B depict views illustrating examples of screens displayed using screen information that the information processing apparatus creates in S1501 of FIG. 15.

FIG. 16A depicts a view illustrating an example of a screen displayed using screen information that the information processing apparatus 118 creates in step S1501 of FIG. 15.

A job status screen 1600 of FIG. 16A is the same screen as the job execution status described in the job status screen 1400 of FIG. 14. In step S1501, since the printing apparatus 101 is in a printing state, "printing" is displayed in an item 1601 for displaying the operation state of the printing apparatus 101. In addition, a message 1602 displaying supplementary information on the operation status of the printing apparatus 101 indicates that sample printing cannot be executed during verification. Sample printing cannot be executed because there is no unit upstream of the verification unit or a discharge tray of the upstream unit is not present. Therefore, it displays that the cause is the device configuration of the printing apparatus.

Figure 16B:
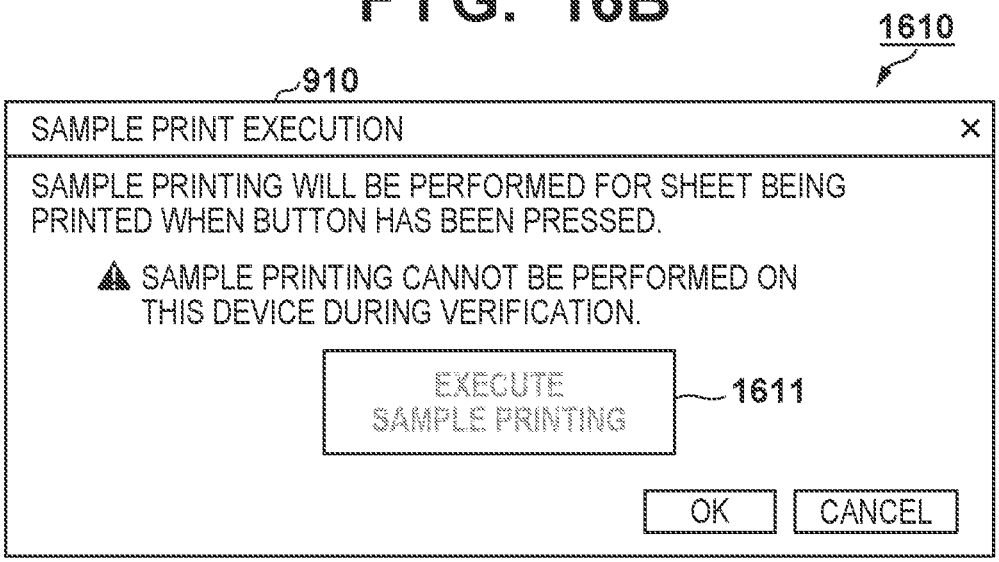

A sample print execution screen 1610 of FIG. 16B indicates an example of a screen for executing sample printing by pressing a button. As described in the sample print execution screen 910 of FIG. 9B, the screen is for the user to perform sample printing at an arbitrary timing during a print job. Since the device configuration is that in which sample printing cannot be performed during verification, in step S1501, the user is notified that sample printing cannot be performed by graying out a sample print button 1611 or the like.

As described above, by virtue of the third embodiment, if a discharge tray for sample printed sheets is not present and sample printing cannot be performed during verification, it is possible to notify the user that sample printing cannot be performed. Also, in such a case, it is possible to prevent the execution of sample printing by graying out a button or the like, for example, so that the user cannot instruct sample printing.

Fourth Embodiment

In the first to third embodiments described above, if there is a discharge tray for sample printed sheets, it is made possible to handle a job for which both verification and sample printing are valid by preventing the sample printed sheet from passing through the verification unit 108. On the other hand, in the fourth embodiment, even if there is no discharge tray for sample printed sheets, it is made possible to handle a job for which both verification and sample printing are valid. Incidentally, the system configuration (FIGS. 1A and 1B), the block configuration (FIG. 2), the internal configuration (FIGS. 3A and 3B), the operation of the verification apparatus (FIG. 4, FIG. 5), the operation of the verification unit (FIG. 6), the operation of acquiring the device configuration (FIG. 8) according to the fourth embodiment are the same as that of the first embodiment, and so their description thereof will be omitted.

Figure 17A:
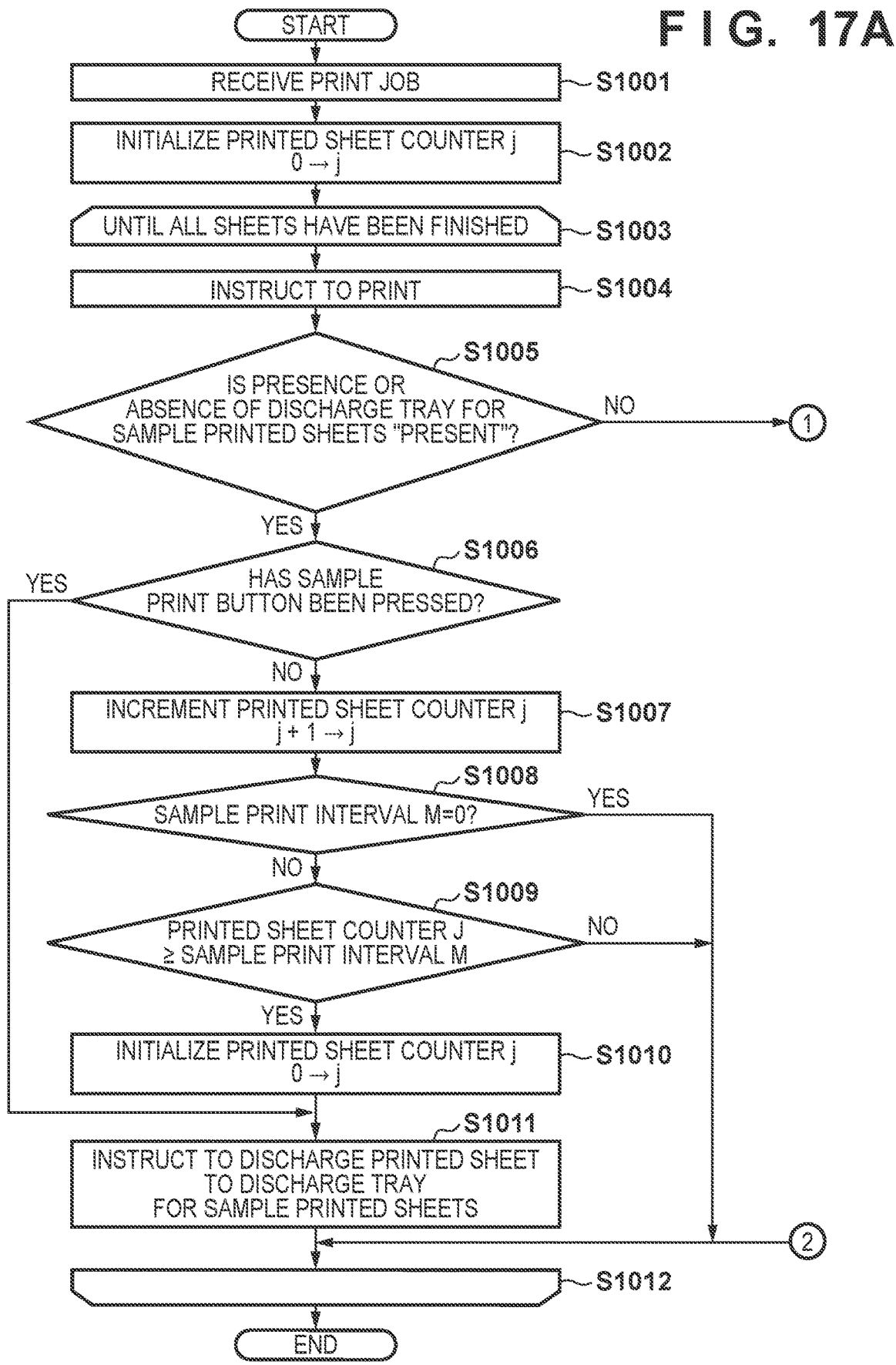
FIGS. 17A and 17B are flowcharts for describing an operation for when the information processing apparatus according to a fourth embodiment receives and executes a print job.
Figure 17B:
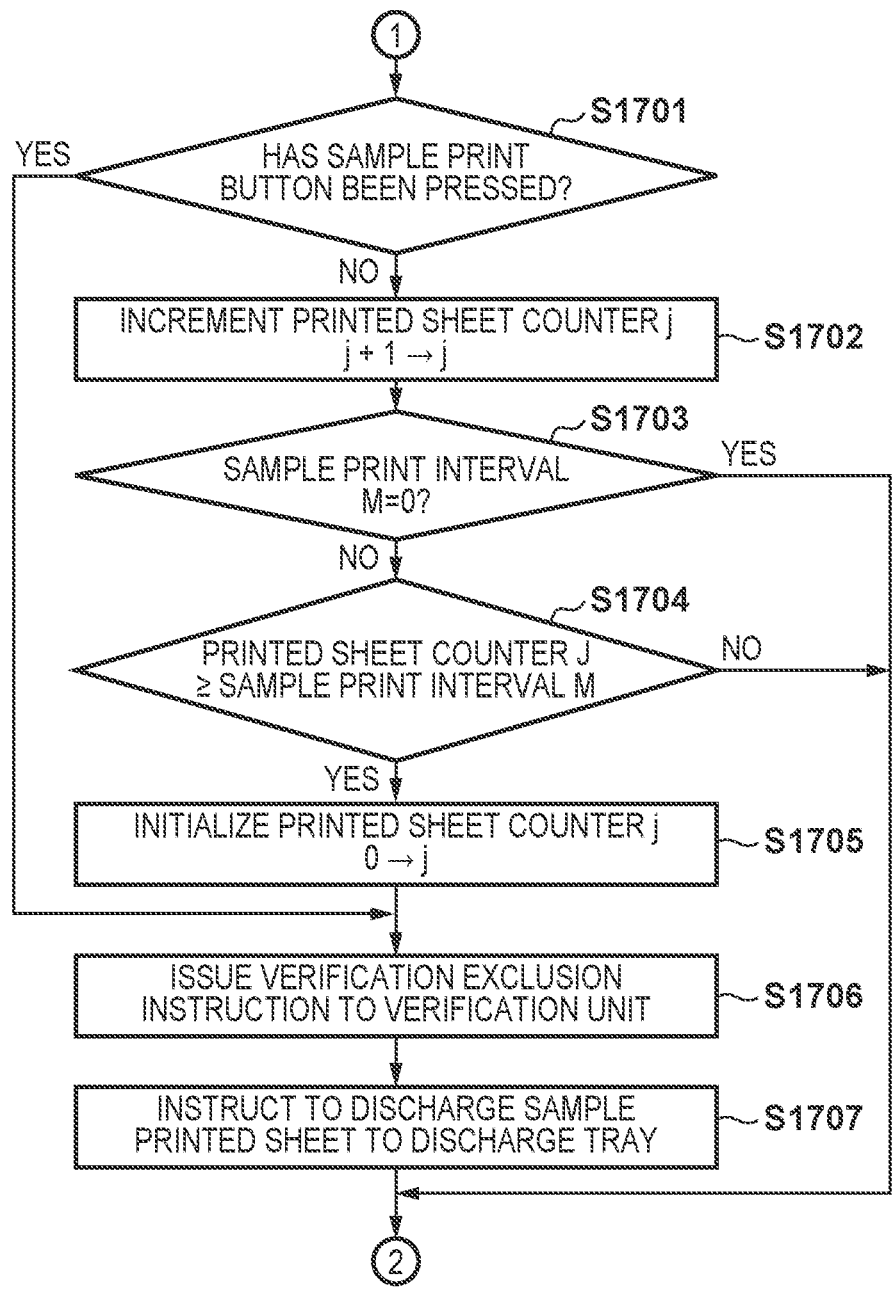

FIGS. 17A and 17B are flowcharts for explaining an operation for when the information processing apparatus 118 according to the fourth embodiment receives and executes a print job. Processing described in the flowcharts is started by the information processing apparatus 118 receiving a print job. Incidentally, processing in common with the above-described FIGS. 10A and 10B is denoted by the same reference numerals, and their description thereof will be omitted.

In step S1005, the CPU 234 determines whether the presence or absence of the discharge tray for sample printed sheets is set to "absent" and, if "absent", the process proceeds to step S1701 (FIG. 17B). Step S1701 through step S1705 are thus executed and when the timing of the sample printing arrives, the process proceeds to step S1706. The process of step S1701 through step S1705 is the same as the treatment of step S1006 through step S1010. In step S1706, the CPU 234 issues a verification exclusion instruction for the sample printed sheet. This verification exclusion instruction is transmitted to the verification unit 108 via the NW I/Fs 238 and 207 and the accessory I/Fs 208 and 214. The operation of the verification unit 108 which has received the verification exclusion instruction will be described later with reference to the flowchart of FIG. 18.

Then, the process proceeds to step S1707, and the CPU 234 instructs the printing apparatus 101 to discharge the sample printed sheet to the discharge tray set in the print job. In the case of sample printing, the job setting information and the image data for one sheet transmitted to the printing apparatus 101 in step S1004 are used, so they are transmitted again to the printing apparatus 101. At this time, the discharge destination tray in the job setting information is not overwritten with the discharge tray for sample printed sheets registered in step S807.

Figure 18:
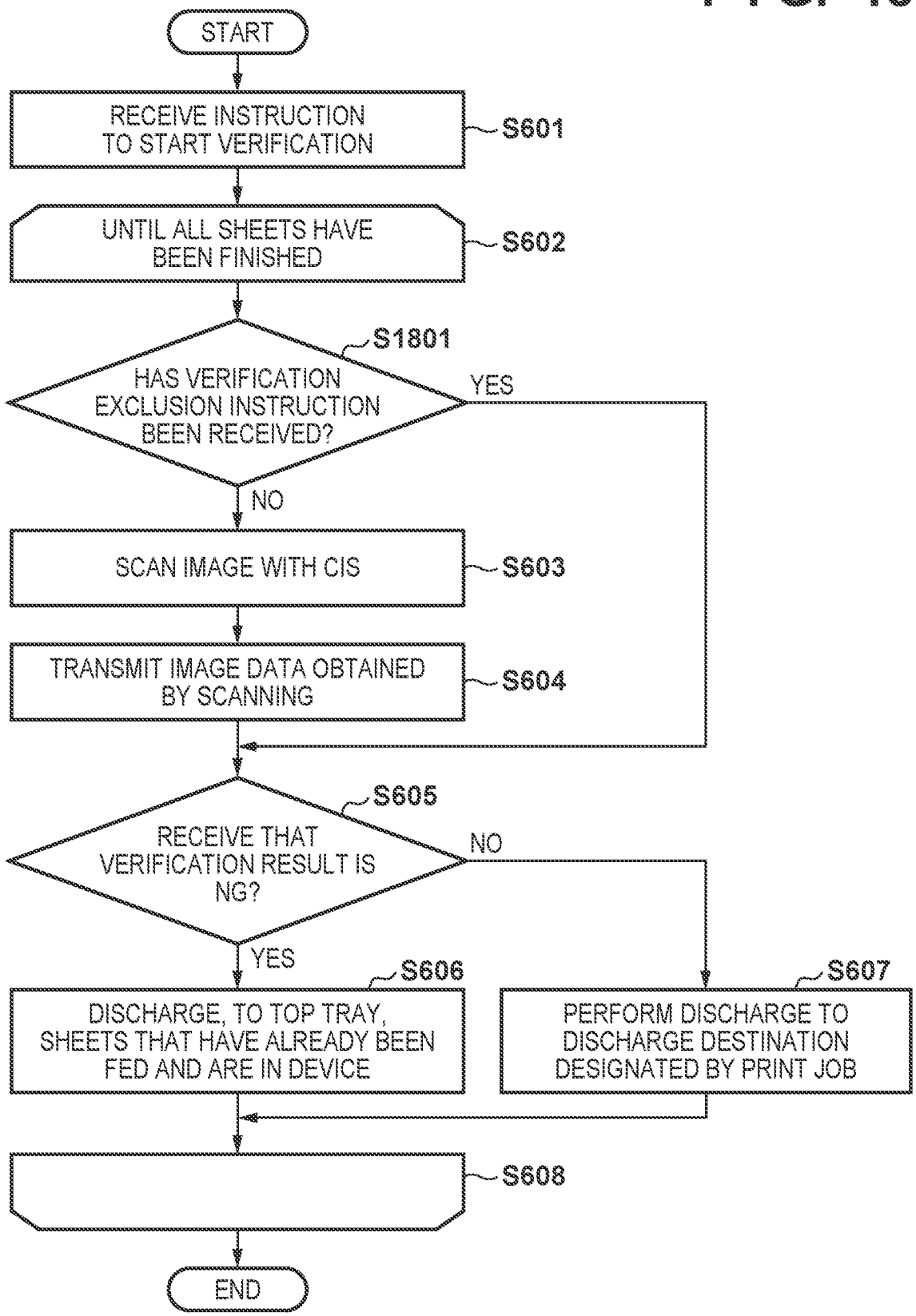
FIG. 18 is a flowchart for describing a process for when the verification unit according to the fourth embodiment executes verification.

FIG. 18 is a flowchart for describing a process for when the verification unit 108 according to the fourth embodiment executes verification. Incidentally, in FIG. 18, processing in common with the above-described FIG. 6 is denoted by the same reference numerals, and their description thereof will be omitted.

In step S1801, the CPU 216 determines whether a verification exclusion instruction has been received via the accessory I/F 214. When it is determined that a verification exclusion instruction has not been received here, the process proceeds to step S603. In step S603, the CPU 216 scans images with CIS and transmits the scanned image data in step S604. Meanwhile, when it is determined in step S1801 that the verification exclusion instruction has been received, the CPU 216 skips the scanning of the image with the CIS and the transmission of the scanned image data and the process advances to step S605. Thus, when the verification exclusion instruction is received, by not scanning the image and transmitting the scanned image data, the verification apparatus 109 does not execute the verification process (step S504 through step S511) when executing verification. Thus, the sample printed sheet can be excluded from the verification target.

As described above, by virtue of the fourth embodiment, even if there is no discharge tray for sample printed sheets, it is possible to handle a job for which both verification and sample printing are valid.

According to the embodiments described above, an inconsistency with the order of the reference images that the verification apparatus expects does not occur even when performing sample printing while executing verification. In other words, it is possible to perform sample printing while performing verification, thereby improving user convenience.

Note that, in the above-described embodiment, description has been given assuming that the adjustment unit, the verification unit, the large-volume stacker, and the staple unit are connected to the printing apparatus; however, the printing apparatus may be configured to include the adjustment unit, the verification unit, the large-volume stacker, and the staple unit.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-022045, filed Feb. 15, 2021, and Japanese Patent Application No. 2022-000683, filed Jan. 5, 2022, which are hereby incorporated by reference herein in their entirety.

What is claimed is:

1. A print system operable to inspect a printed sheet, the system comprising:
    a printing apparatus, including a printer engine, that prints an image on a sheet;
    an image reading apparatus that receives the sheet printed by the printing apparatus, reads the image on the sheet, and then conveys the sheet;
    a verification apparatus, including a processor, connected to the image reading apparatus, and configured to receive read images of sheets printed by the printing apparatus in predetermined order and compare the read images with corresponding reference images arranged in the predetermined order to determine quality of the images of the sheets; and
    an information processing apparatus comprising one or more controllers, including at least one processor and at least one memory, configured to:
    determine whether or not a device, including a discharge tray, is present between
    the printing apparatus and the image reading apparatus; and
        in a state where the device is determined to be present and a timing of sample printing for a user to confirm printing on the sheet is during execution of a print job using the printing apparatus and the image reading apparatus, control discharging of the sheet printed in the sample printing to the discharge tray of the device.

2. The print system according to claim 1, wherein the device includes at least a path that receives the sheet printed by the printing apparatus and conveys the sheet to the image reading apparatus, which is on a downstream side of the printing apparatus in the print system.

3. The print system according to claim 1, wherein the one or more controllers are further configured to not execute the sample printing, during the discharge control, in a state where the device is determined to be not present.

4. The print system according to claim 3, wherein the one or more controllers are further configured to control displaying that the sample printing will not be executed, during the discharge control, in the state where the device is determined to be not present.

5. The print system according to claim 1, wherein the timing of the sample printing is set based on a number of sheets to be printed by the printing apparatus.

6. The print system according to claim 1, wherein the timing of the sample printing is based on an instruction of the user.

7. The print system according to claim 1, wherein:
the information processing apparatus further comprises a storage that stores information of the device, which is connected on a downstream side of the printing apparatus in the print system, and
the one or more controllers are configured to, during the determination, determine whether or not the device is present based on the information stored in the storage.

8. The print system according to claim 1, wherein the one or more controllers are further configured to, during the discharge control, in a state where the device is determined to be present but the discharge tray of the device cannot be used, not execute the sample printing and display that the sample printing will not be executed.

9. The print system according to claim 1, wherein the one or more controllers are further configured to:
cause the printing apparatus to execute the sample printing; and
during the discharge control, in a state where the printing apparatus is caused to execute the sample printing and the device is determined to be not present, instruct discharging of the sheet printed in the sample printing to a discharge tray of the printing apparatus.

10. An information processing apparatus operable to control a printing apparatus, including a printer engine, an image reading apparatus that receives a sheet printed by the printing apparatus, reads an image on the sheet, and then conveys the sheet, and a verification apparatus, including a processor, configured to receive read images of sheets printed by the printing apparatus in predetermined order and compare the read images with corresponding reference images arranged in the predetermined order to determine quality of the images of the sheets, the information processing apparatus comprising:
one or more controllers, including at least one processor and at least one memory, configured to:
determine whether or not a device, including a discharge tray, is present between the printing apparatus and the image reading apparatus; and
in a state where the device is determined to be present, and a timing of sample printing for a user to confirm printing on the sheet is during execution of a print job using the printing apparatus and the image reading apparatus, control discharging of the sheet printed in the sample printing to the discharge tray of the device.

11. The information processing apparatus according to claim 10, wherein the device includes at least a path that receives the sheet printed by the printing apparatus and conveys the sheet to the image forming apparatus, which is on a downstream side of the printing apparatus in the print system.

12. The information processing apparatus according to claim 10, wherein the one or more controllers are further configured to not execute the sample printing, during the discharge control, in a state where the device is determined to be not present.

13. The information processing apparatus according to claim 12, wherein the one or more controllers are further configured to control displaying that the sample printing will not be executed, during the discharge control, in the state where the device is determined to be not present.

14. The information processing apparatus according to claim 10, further comprising
a storage that stores information of the device, which is connected on a downstream side of the printing apparatus,
wherein the one or more processors are configured to, during the determination, determine whether or not the device is present based on the information stored in the storage.

15. A method of controlling an information processing apparatus operable to control a printing apparatus, including a printer engine, an image reading apparatus that receives a sheet printed by the printing apparatus, reads an image on the sheet, and then conveys the sheet, and a verification apparatus, including a processor, configured to receive read images of sheets printed by the printing apparatus in predetermined order and compare the read images with corresponding reference images arranged in the predetermined order to determine quality of the images of the sheets, the method comprising:
determining whether or not a device, including a discharge tray, is present between the printing apparatus and the image reading apparatus; and
in a state where the determining determines that the device is present and a timing of sample printing for a user to confirm printing on the sheet is during execution of a print job using the printing apparatus and the image reading apparatus, controlling discharging of the sheet printed in the sample printing to the discharge tray of the device.

16. A non-transitory computer-readable storage medium storing a program executable by a processor to execute a method of controlling an information processing apparatus operable to control a printing apparatus, including a printer engine, an image reading apparatus that receives a sheet printed by the printing apparatus, reads an image on the sheet, and then conveys the sheet, and a verification apparatus, including a processor, configured to receive read images of sheets printed by the printing apparatus in predetermined order and compare the read images with corresponding reference images arranged in the predetermined order to determine quality of the images of the sheets, the method comprising:
determining whether or not a device, including a discharge tray, is present between the printing apparatus and the image reading apparatus; and
in a state where the determining determines that the device is present and a timing of sample printing for a user to confirm printing on the sheet is during execution of a print job using the printing apparatus and the image reading apparatus, controlling discharging of the sheet printed in the sample printing to the discharge tray of the device.

17. The print system according to claim 1, wherein the one or more controllers are further configured to:
   display a setting screen for setting a timing of the sample printing; and
   set an interval timing of the sample printing based on a number of sheets printed by the printing apparatus input via the setting screen.

18. The print system according to claim 1, wherein the one or more controllers are further configured to:
   display a screen for executing the sample printing; and
   cause the printing apparatus to execute the sample printing in accordance with an instruction input via the screen.

\* \* \* \* \*